United States Patent
Omuro et al.

(10) Patent No.: US 10,562,522 B2
(45) Date of Patent: Feb. 18, 2020

(54) CONTROL APPARATUS FOR VEHICULAR POWER TRANSMITTING SYSTEM

(71) Applicant: TOYOTA JIDOSHA KABUSHIKI KAISHA, Toyota-shi, Aichi (JP)

(72) Inventors: Keisuke Omuro, Toyota (JP); Atsushi Tabata, Okazaki (JP); Tatsuya Imamura, Okazaki (JP); Koichi Okuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/137,924

(22) Filed: Sep. 21, 2018

(65) Prior Publication Data

US 2019/0084555 A1 Mar. 21, 2019

(30) Foreign Application Priority Data

Sep. 21, 2017 (JP) ................. 2017-181658

(51) Int. Cl.
*B60W 10/08* (2006.01)
*B60W 20/40* (2016.01)
(Continued)

(52) U.S. Cl.
CPC ............. *B60W 20/40* (2013.01); *B60K 6/442* (2013.01); *B60K 6/445* (2013.01); *B60W 10/02* (2013.01); *B60W 10/06* (2013.01); *B60W 10/08* (2013.01); *B60W 30/18136* (2013.01); *B60W 2710/021* (2013.01); *B60W 2710/0644* (2013.01); *B60Y 2200/92* (2013.01); *F16H 2059/366* (2013.01); *F16H 2200/2007* (2013.01);
(Continued)

(58) Field of Classification Search
CPC ............... Y10T 477/26; Y10T 477/676; F16H 2059/366; F16H 2200/2007; F16H 2200/2038; B60Y 2200/92; B60W 20/40; B60W 10/02; B60W 10/06; B60W 10/08; B60W 30/18136; B60W 2710/0644; B60W 2710/021; B60W 10/10; B60W 30/182
See application file for complete search history.

(56) References Cited

U.S. PATENT DOCUMENTS 5,923,093 A * 7/1999 Tabata ................... B60K 6/365
290/40 C
2009/0120700 A1* 5/2009 Fukumura ............. B60K 6/365
180/65.265
(Continued)

FOREIGN PATENT DOCUMENTS

JP 2009-002282 A 1/2009

Primary Examiner — Roger L Pang
(74) Attorney, Agent, or Firm — Oliff PLC

(57) ABSTRACT

A control apparatus for a power transmitting system of a vehicle includes a drive mode control portion for selectively establishing one of first and second engine-braking drive modes in which a braking torque of the engine is applied to the vehicle. The first engine-braking drive mode is established in an engaged state of the first coupling device, while the second engine-braking drive mode is established in an engaged state of the second coupling device. The drive mode control portion switches the power transmitting system between the first and second engine-braking drive modes, such that the engine speed is held constant in the process of switching between the first and second engine-braking drive modes.

14 Claims, 27 Drawing Sheets

(51) Int. Cl.
*B60W 10/02* (2006.01)
*B60W 10/06* (2006.01)
*B60K 6/442* (2007.10)
*B60K 6/445* (2007.10)
*B60W 30/18* (2012.01)
*F16H 59/36* (2006.01)

(52) U.S. Cl.
CPC ..... *F16H 2200/2038* (2013.01); *Y10T 477/26* (2015.01); *Y10T 477/676* (2015.01)

(56) References Cited

U.S. PATENT DOCUMENTS

2016/0167504 A1* 6/2016 Kanada .................. B60K 6/387
475/5
2019/0084404 A1* 3/2019 Imai ........................ B60K 6/445
2019/0084554 A1* 3/2019 Yamamoto ............ B60W 20/10

* cited by examiner

FIG.3

| DRIVE MODE | | | | | CL1 | BR1 | CLc | MG1 | MG2 |
|---|---|---|---|---|---|---|---|---|---|
| MOTOR DRIVE MODE (EV DRIVE MODE) | FORWARD DRIVE/ REVERSE DRIVE | SINGLE-MOTOR DRIVE | DRIVING | NORMAL | | | | | M |
| | | | | STANDBY SUB-MODES O/D INPUT SPLIT | | | ○ | | M |
| | | | | STANDBY SUB-MODES U/D INPUT SPLIT | ○ | | | | M |
| | | | ASSISTING ENGINE BRAKING | O/D INPUT SPLIT | | | △ | G | M |
| | | | | U/D INPUT SPLIT | △ | | | G | M |
| | | TWO-MOTOR DRIVE | | | ○ | ○ | | M | M |
| ENGINE DRIVE MODE (HV DRIVE MODE) | O/D INPUT SPLIT | FORWARD DRIVE | | | | | ○ | G | M |
| | | REVERSE DRIVE | FORWARD ENGINE DRIVE FORCE INPUT | | | | ○ | G | M |
| | U/D INPUT SPLIT | FORWARD DRIVE | | | ○ | | | G | M |
| | | REVERSE DRIVE | REVERSE ENGINE DRIVE FORCE INPUT | | | | ○ | G | M |
| | | | FORWARD ENGINE DRIVE FORCE INPUT | | ○ | | | G | M |
| | FIXED SPEED POSITION | FORWARD DRIVE | DIRECT ENGINE FORCE INPUT | | ○ | | ○ | | |
| | | | STATIONARY OUTPUT SHAFT | | | ○ | ○ | G | |

"○": ENGAGED STATE   "△": ONE OR BOTH OF CL1 AND CLc ENGAGED
"G": PRINCIPALLY FUNCTIONING AS GENERATOR
"M": PRINCIPALLY FUNCTIONING AS MOTOR (OR AS GENERATOR AS NEEDED)
BLANK: RELEASED STATE

FIG.28

| DRIVE MODE | | | | | | CL1 | BR1 | CLc | MG1 | MG2 |
|---|---|---|---|---|---|---|---|---|---|---|
| MOTOR DRIVE MODE (EV DRIVE MODE) | FORWARD DRIVE/ REVERSE DRIVE | SINGLE-MOTOR DRIVE | DRIVING | NORMAL | | | | | | M |
| | | | | STANDBY SUB-MODES | O/D INPUT SPLIT | | | ○ | | |
| | | | | | U/D INPUT SPLIT | ○ | | | | |
| | | | ASSISTING ENGINE BRAKING | O/D INPUT SPLIT | | | | △ | G | M |
| | | | | U/D INPUT SPLIT | | △ | | | G | M |
| | | TWO-MOTOR DRIVE | | | | ○ | ○ | | M | M |
| ENGINE DRIVE MODE (HV DRIVE MODE) | O/D INPUT SPLIT | FORWARD DRIVE | | | | | | ○ | G | M |
| | | REVERSE DRIVE | FORWARD ENGINE DRIVE FORCE INPUT | | | | | ○ | G | M |
| | U/D INPUT SPLIT | FORWARD DRIVE | LOW SPEED | | | ○ | | | G | M |
| | | | HIGH SPEED | | | | | ○ | G | M |
| | | REVERSE DRIVE | FORWARD ENGINE DRIVE FORCE INPUT | | | ○ | | | G | M |
| | FIXED SPEED POSITION | FORWARD DRIVE | DIRECT ENGINE FORCE INPUT | | | ○ | | ○ | | |
| | | | FIXED-SPEED-POSITION O/D DRIVE | | | | ○ | ○ | | |

"○": ENGAGED STATE  "△": ONE OR BOTH OF CL1 AND CLc ENGAGED
"G": PRINCIPALLY FUNCTIONING AS GENERATOR
"M": PRINCIPALLY FUNCTIONING AS MOTOR (OR AS GENERATOR AS NEEDED)
BLANK: RELEASED STATE

FIG.32

| DRIVE MODE | | | | | CL1 | BR1 | CLc | MG1 | MG2 |
|---|---|---|---|---|---|---|---|---|---|
| MOTOR DRIVE MODE (EV DRIVE MODE) | FORWARD DRIVE/ REVERSE DRIVE | SINGLE-MOTOR DRIVE | DRIVING | NORMAL | | | | | M |
| | | | | STANDBY SUB-MODES O/D INPUT SPLIT | ○ | | | | M |
| | | | | STANDBY SUB-MODES U/D INPUT SPLIT | | | ○ | | M |
| | | | ASSISTING ENGINE BRAKING | O/D INPUT SPLIT | △ | | | G | M |
| | | | | U/D INPUT SPLIT | | | △ | G | M |
| | | TWO-MOTOR DRIVE | | | ○ | ○ | | M | M |
| ENGINE DRIVE MODE (HV DRIVE MODE) | O/D INPUT SPLIT | FORWARD DRIVE | | | ○ | | | G | M |
| | | REVERSE DRIVE | REVERSE ENGINE DRIVE FORCE INPUT | | | ○ | | G | M |
| | | | FORWARD ENGINE DRIVE FORCE INPUT | | ○ | | | G | M |
| | U/D INPUT SPLIT | FORWARD DRIVE | | | | | ○ | G | M |
| | | REVERSE DRIVE | FORWARD ENGINE DRIVE FORCE INPUT | | | | ○ | G | M |
| | FIXED SPEED POSITION | FORWARD DRIVE | DIRECT ENGINE FORCE INPUT | | ○ | | ○ | | |
| | | | STATIONARY OUTPUT SHAFT | | | ○ | ○ | G | |

"○": ENGAGED STATE    "△": ONE OR BOTH OF CL1 AND CLc ENGAGED
"G": PRINCIPALLY FUNCTIONING AS GENERATOR
"M": PRINCIPALLY FUNCTIONING AS MOTOR (OR AS GENERATOR AS NEEDED)
BLANK: RELEASED STATE

FIG.37

| DRIVE MODE | | | | | | CL1 | BR1 | CLc | MG1 | MG2 |
|---|---|---|---|---|---|---|---|---|---|---|
| MOTOR DRIVE MODE (EV DRIVE MODE) | FORWARD DRIVE/ REVERSE DRIVE | SINGLE-MOTOR DRIVE | DRIVING | NORMAL | | | | | | M |
| | | | | STANDBY SUB-MODES | O/D INPUT SPLIT | ○ | | | | |
| | | | | | U/D INPUT SPLIT | | | ○ | | |
| | | | ASSISTING ENGINE BRAKING | O/D INPUT SPLIT | | △ | | | G | M |
| | | | | U/D INPUT SPLIT | | | | △ | G | M |
| | | TWO-MOTOR DRIVE | | | | ○ | ○ | | M | M |
| ENGINE DRIVE MODE (HV DRIVE MODE) | O/D INPUT SPLIT | FORWARD DRIVE | LOW SPEED | | | | ○ | | G | M |
| | | | HIGH SPEED | | | ○ | | | G | M |
| | | REVERSE DRIVE | FORWARD ENGINE DRIVE FORCE INPUT | | | ○ | | | G | M |
| | U/D INPUT SPLIT | FORWARD DRIVE | | | | | | ○ | G | M |
| | | REVERSE DRIVE | FORWARD ENGINE DRIVE FORCE INPUT | | | | | ○ | G | M |
| | FIXED SPEED POSITION | FORWARD DRIVE | DIRECT ENGINE FORCE INPUT | | | ○ | | ○ | | |
| | | | FIXED-SPEED-POSITION U/D DRIVE | | | | ○ | ○ | | |

"○": ENGAGED STATE  "△": ONE OR BOTH OF CL1 AND CLc ENGAGED
"G": PRINCIPALLY FUNCTIONING AS GENERATOR
"M": PRINCIPALLY FUNCTIONING AS MOTOR (OR AS GENERATOR AS NEEDED)
BLANK: RELEASED STATE

CONTROL APPARATUS FOR VEHICULAR POWER TRANSMITTING SYSTEM

This application claims priority from Japanese Patent Application No. 2017-181658 filed on Sep. 21, 2017, the disclosure of which is herein incorporated by reference in its entirety.

FIELD OF THE INVENTION

The present invention relates to a control apparatus for a vehicle provided with a differential mechanism through which a drive force of an engine is transmitted.

BACKGROUND OF THE INVENTION

There is well known a control apparatus for a vehicle provided with a differential mechanism through which a drive force of an engine is transmitted. JP-2009-2282A discloses an example of a drive force and braking force control apparatus. This drive force control apparatus is adapted to control a vehicle provided with: a first motor/generator; a second motor/generator operatively connected in a power transmittable manner to an output rotary member connected to drive wheels; and a differential mechanism to which an engine is operatively connected in a power transmittable manner, and a differential state of which is controlled by controlling an operating state of the first motor/generator. The drive force control apparatus controls an operating speed of the engine by controlling an operation of the first motor/generator, on the basis of a predetermined lower limit of the operating speed of the engine above which an effective braking force of the engine can be applied to the vehicle.

SUMMARY OF THE INVENTION

By the way, the vehicle may be provided with: a first differential mechanism to which an engine is operatively connected in a power transmittable manner and which has a first rotary element, a second rotary element and a third rotary element; a first motor/generator; a second differential mechanism which has a fourth rotary element, a fifth rotary element and sixth rotary element and a differential state of which is controlled by controlling an operating state of the first motor/generator; and a second motor/generator operatively connected in a power transmittable manner to an output rotary member connected to drive wheels. The first and second differential mechanisms may be provided with a plurality of coupling devices such as coupling devices for selectively connecting the rotary elements of the first differential mechanism, and a coupling device for connecting the first and second differential mechanisms, so that the first and second differential mechanisms cooperate to constitute a differential mechanism device a drive force distributing ratio of which is different from that of the second differential mechanism alone, and which is selectively placed in one of a plurality of drive modes by controlling operating states of the plurality of coupling devices. The vehicle having the differential mechanism device the differential state of which is controllable at different drive force distributing ratios may be driven in different engine-braking drive modes in which a braking torque of the engine is applicable to the vehicle. The differential mechanism device may be switched from one of the different engine-braking drive modes to another, and may suffer from a shifting shock due to a variation of an engine braking torque upon switching between the different engine-braking drive modes. Therefore, there has been a need of improving the vehicle control apparatus, regarding switching of a vehicular power transmitting system between the different engine-braking drive modes.

The present invention was made in view of the background art described above. It is therefore an object of the present invention to provide a control apparatus for a power transmitting system of a vehicle, which permits reduction of a risk of generation of a shifting shock of the power transmitting system upon its switching between different engine-braking drive modes.

The object indicated above is achieved according to the following modes of the present invention:

According to a first mode of the invention, there is provided a control apparatus for a power transmitting system of a vehicle including: an engine; an output rotary member; drive wheels connected to the output rotary member; a first differential mechanism having a first rotary element operatively connected to the engine in a power transmittable manner, a second rotary element, and a third rotary element; a second differential mechanism having a fourth, rotary element, a fifth rotary element connected to the output rotary member, and a sixth rotary element connected to the third rotary element; a first motor/generator which is operatively connected to the fourth rotary element in a power transmittable manner, and an operating state of which is controlled to control a differential state of the second differential mechanism; a second motor/generator operatively connected to the output rotary member in a power transmittable manner; a first coupling device for connecting two elements of the first, second and third rotary elements to each other; and a second coupling device for connecting the second rotary element to one of the fourth and fifth rotary elements, the control apparatus comprising a drive mode control portion configured to selectively establish one of a first engine-braking drive mode and a second engine-braking drive mode of the power transmitting system in which a braking torque of the engine is applied to the vehicle, the first engine-braking drive mode being established in an engaged state of the first coupling device, while the second engine-braking drive mode being established in an engaged state of the second coupling device. The drive mode control portion switches the power transmitting system between the first and second engine-braking drive modes, such that an operating speed of the engine is held constant in the process of switching between the first and second engine-braking drive modes.

According to a second mode of the invention, all of the rotary elements of the first and second differential mechanisms are rotated as a unit when the first and second coupling devices are placed in the engaged states, and the drive mode control portion switches the power transmitting system between the first and second engine-braking drive modes, by switching operating states of the first and second coupling devices in a state of the first and second differential mechanisms in which all of their rotary elements are rotated as a unit.

According to a third mode of the invention, the drive mode control portion switches the power transmitting system between the first and second engine-braking drive modes, by controlling the first and second coupling devices such that one of the first and second coupling devices which has been placed in a released state prior to a switching operation of the power transmitting system between the first and second engine-braking drive modes is brought into the engaged state while the other of the first and second coupling devices which has been placed in the engaged state prior to the switching operation is brought into a released state, the drive mode control portion controlling the first motor/generator such that the operating speed of the engine is held constant in the process of the switching operation.

According to a fourth mode of the invention, the drive mode control portion controls the first motor/generator in the process of a change of a rotating speed of the third rotary element, such that the operating speed of the engine is held constant.

According to a fifth mode of the invention, all of the rotary elements of the first and second differential mechanisms are rotated as a unit when the first and second coupling devices are placed in the engaged states, and the drive mode control portion is configured to selectively implement: a synchronous switching control for switching the power transmitting system between the first and second engine-braking drive modes, by switching operating states of the first and second coupling devices in a state of the first and second differential mechanisms in which all of their rotary elements are rotated as a unit; and a non-synchronous switching control for switching the power transmitting system between the first and second engine-braking drive modes, by controlling the first and second coupling devices such that one of the first and second coupling devices which has been placed in a released state prior to the switching of the power transmitting system between the first and second engine-braking drive modes is brought into the engaged state while the other of the first and second coupling devices which has been placed in the engaged state prior to the switching of the power transmitting system between the first and second engine-braking drive modes is brought into a released state, and by controlling the first motor/generator such that the operating speed of the engine is held constant in the process of switching of the power transmitting system between the first and second engine-braking drive modes, and the drive mode control portion is configured to implement the synchronous switching control with higher priority than the non-synchronous switching control.

According to a sixth mode of the invention, the control apparatus further comprises a running state determining portion configured to determine whether the vehicle is placed in a running state in which the drive mode control portion can implement the synchronous switching control, by determining whether operating states of the first and second differential mechanisms are changing, with a change of a running speed of the vehicle, toward the state in which all of their rotary elements are rotated as a unit.

According to a seventh mode of the invention, where the running state determining portion has determined that the vehicle is in the running state in which the drive mode control portion can implement the synchronous switching control, the drive mode control portion does not implement the synchronous switching control until the first and second differential mechanisms have been brought into the state in which all of their rotary elements are rotated as a unit.

According to an eighth mode of the invention, the drive mode control portion determines whether the power transmitting system should be switched from one of the first and second engine-braking drive modes to the other, according to a predetermined drive mode switching relationship, and switches the power transmitting system from the above-indicated one engine-braking drive mode to the above-indicated other engine-braking drive mode when the drive mode control portion has determined that the power transmitting system should be switched from the above-indicated one engine-braking drive mode to the above-indicated other engine-braking drive mode.

According to the first mode of the invention, the control apparatus for the vehicular power transmitting system is configured to switch the power transmitting system between the first and second engine-braking drive modes, such that the operating speed of the engine is held constant in the process of switching between the two engine-braking drive modes, so that the amount of change of the engine speed is reduced, and the amount of variation of the engine braking torque is accordingly reduced. Accordingly, the present control apparatus permits reduction of risk of generation of a shifting shock of the power transmitting system upon its switching between the two engine-braking drive modes.

The control apparatus according to the second mode of the invention switches switch the power transmitting system between the first and second engine-braking drive modes, by switching the operating states of the first and second coupling devices in the state of the first and second differential mechanisms in which all of their rotary elements are rotated as a unit, namely. Accordingly, the power transmitting system is switched between the first and second engine-braking drive modes, so as to reduce an amount of change of the rotating speeds of the rotary elements of the first and second differential mechanisms, and so as to hold the operating speed of the engine constant, in the process of switching of the power transmitting system between the first and second engine-braking drive modes.

The control apparatus according to the third mode of the invention switches the power transmitting system between the first and second engine-braking drive modes, by controlling the first and second coupling devices such that one of the first and second coupling devices which has been placed in the released state prior to the switching operation of the power transmitting system between the first and second engine-braking drive modes is brought into the engaged state while the other of the first and second coupling devices which has been placed in the engaged state prior to the switching operation is brought into the released state, and controls the first motor/generator such that the operating speed of the engine is held constant in the process of the switching operation. Thus, the power transmitting system is switched between the first and second engine-braking drive modes, such that the operating speed of the engine is held constant in the process of the switching operation of the power transmitting system between the first and second engine-braking drive modes.

The control apparatus according to the fourth mode of the invention controls the first motor/generator in the process of a change of the rotating speed of the third rotary element, such that the operating speed of the engine is held constant. Accordingly, an amount of change of the engine speed can be adequately reduced.

The control apparatus according to the fifth mode of the invention selectively implements one of the synchronous switching control and the non-synchronous switching control, for switching the power transmitting system between the first and second engine-braking drive modes, such that the operating speed of the engine is held constant in the process of switching of the power transmitting system between the first and second engine-braking drive modes. Where the vehicle is placed in the running state in which the synchronous switching control can be implemented, this synchronous switching control is implemented with higher priority than the non-synchronous switching control. Accordingly, there is a high degree of opportunity of switching the power transmitting system between the first and second engine-braking drive modes such that the operating speed of the engine can be held constant by merely switching the operating states of the two coupling devices without a need of controlling the first motor/generator to control the operating speed of the engine.

The control apparatus according to the sixth mode of the invention determines whether the vehicle is placed in the running state in which the synchronous switching control can be implemented, by determining whether the operating states of the first and second differential mechanisms are changing, with a change of the running speed of the vehicle, toward the state in which all of their rotary elements are rotated as a unit. Thus, the synchronous switching control and the non-synchronous switching control are selectively implemented, such that the synchronous switching control is implemented with higher priority than the non-synchronous switching control.

The control apparatus according to the seventh mode of the invention is configured such that where it is determined that the vehicle is in the running state in which the synchronous switching control can be implemented, the synchronous switching control is not implemented until the first and second differential mechanisms have been brought into the state in which all of their rotary elements are rotated as a unit. Accordingly, the operating states of the first and second coupling devices can be adequately switched in the vehicle running state in which all of the rotary elements of the first and second differential mechanisms are rotated as a unit.

The control apparatus according to the eighth mode of the invention is configured such that the determination as to whether the power transmitting system should be switched between the first and second engine-braking drive modes is made according to the drive mode switching relationship, and such that the power transmitting system is switched between the first and second engine-braking drive modes when it is determined that the power transmitting system should be switched between the first and second engine-braking drive modes. Accordingly, the engine braking is applied to the vehicle in one of the first and second engine-braking drive modes which is selected according to the running state of the vehicle. In addition, the amount of variation of the braking torque of the engine upon switching of the power transmitting system between the first and second engine-braking drive modes is effectively reduced.

BRIEF DESCRIPTION OF THE DRAWINGS

FIG. 3 is a table indicating the operating states of the coupling devices in different drive sub-modes of the vehicle;

FIG. 28 is a table indicating the operating states of the coupling devices in different drive sub-modes of the vehicular power transmitting system of FIG. 24;

FIG. 32 is a table indicating the operating states of the coupling devices in different drive sub-modes of the vehicular power transmitting system of FIG. 29;

FIG. 37 is a table indicating the operating states of the coupling devices in different drive sub-modes of the vehicular power transmitting system of FIG. 33.

DETAILED DESCRIPTION OF PREFERRED EMBODIMENTS

Preferred embodiments of the present invention will be described in detail by reference to the drawings.

Figure 1:
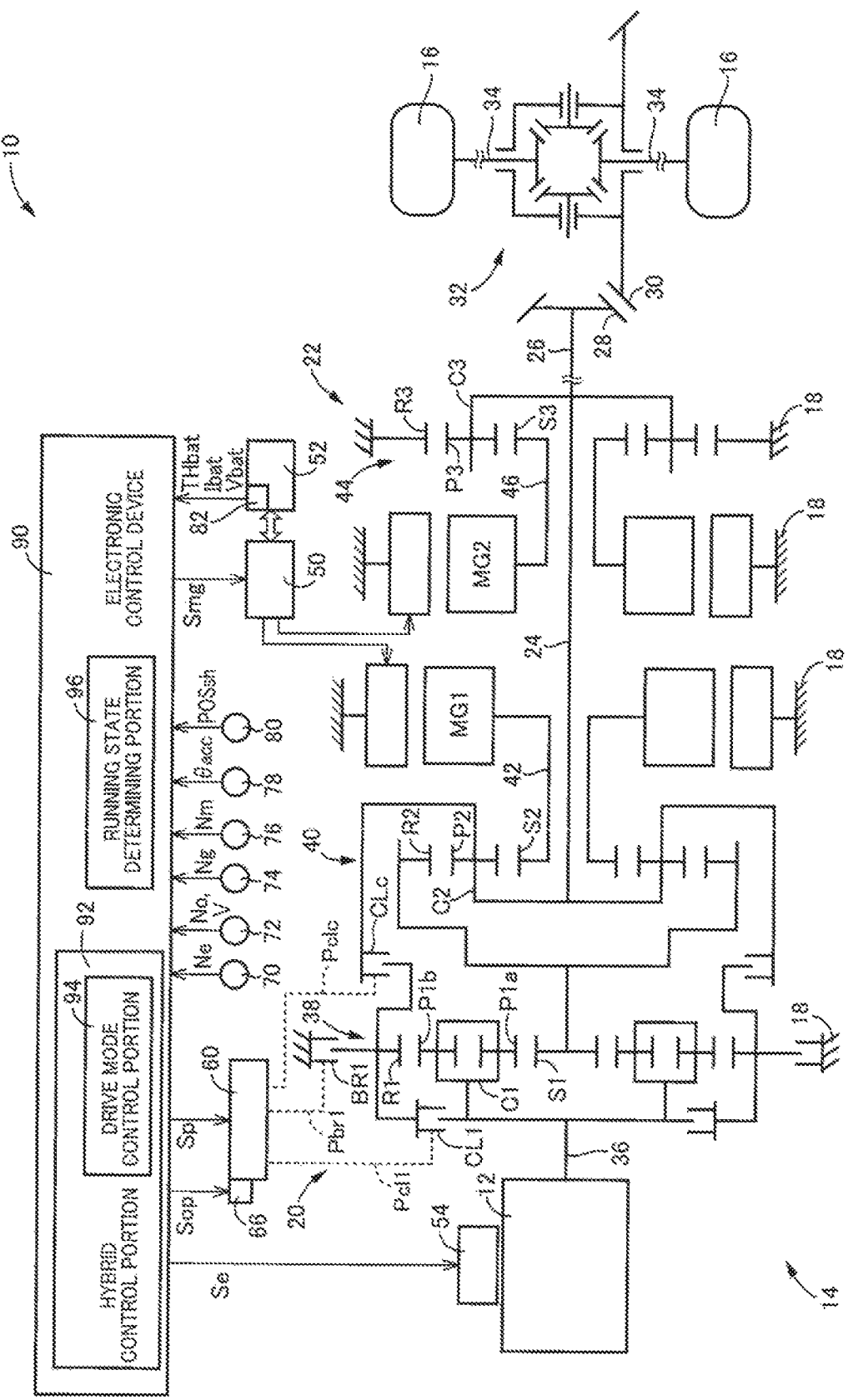
FIG. 1 is a schematic view showing an arrangement of a vehicular power transmitting system controlled by a control apparatus according to the present invention, and major control portions of the control apparatus.

Reference is first made to FIG. 1, which is the schematic view showing an arrangement of a power transmitting system 14 of a vehicle 10 according to a first embodiment of this invention, which is controlled by a control apparatus according to the present invention, and major control portions of the control apparatus. As shown in FIG. 1, the vehicle 10 is a hybrid vehicle provided with an engine 12, a first motor/generator MG1, a second motor/generator MG2, the above-indicated power transmitting system (vehicular power transmitting system) 14, and drive wheels 16. The engine 12, first motor/generator MG1 and second motor/generator MG2 can be used as a vehicle drive power source.

The engine 12 is a known internal combustion engine such as a gasoline engine or a diesel engine, which generates a drive force by combustion of a suitable fuel. The engine 12 is controlled by the control apparatus in the form of an electronic control device 90 described below in detail. Described more specifically, the electronic control device 90 controls a torque Te of the engine 12 (engine torque Te), by controlling its operating state as represented by an angle θ of opening of a throttle valve or an intake air quantity, an amount of injection of the fuel, and an ignition timing.

Each of the first motor/generator MG1 and the second motor/generator MG2 has a function of an electric motor to generate a drive torque and a function of an electric generator. The vehicle 10 is further provided with an electric power control unit 50, and an electric power storage unit in the form of a battery unit 52 to and from which an electric power is supplied. The first motor/generator MG1 and the second motor/generator MG2 are connected to the battery unit 52 through the electric power control unit 50, which has an inverter portion and a smoothing capacitor. The electric power control unit 50 is controlled by the electronic control device 90 to control output torques (vehicle driving torques or regenerative torques) of the first motor/generator MG1 and the second motor/generator MG2, which will be hereinafter referred to as "MG1 torque Tg" and "MG2 torque Tm", respectively.

The power transmitting system 14 is disposed in a power transmitting path between the engine 12 and the drive wheels 16, and includes the first motor/generator MG1, second motor/generator MG2, a first power transmitting portion 20 and a second power transmitting portion 22, which are disposed within a casing 18 which is a stationary member fixed to a body of the vehicle 10. The power transmitting system 14 further includes: a propeller shaft 26 connected to an output shaft 24 which is an output rotary member of the first power transmitting portion 20; a drive pinion 28 connected to the propeller shaft 26; a differential gear device 32 meshing with a drive pinion 28 through a differential ring gear 30; and drive axles 34 connected to the differential gear device 32.

The first power transmitting portion 20 is disposed coaxially with its input rotary member in the form of an input shaft 36 connected to a crankshaft of the engine 12, and includes a first differential mechanism 38, a second differential mechanism 40, the first motor/generator MG1, a clutch CL1, a brake BR1 and a clutch CLc.

The first differential mechanism 38 is a known planetary gear mechanism of a double-pinion type which has: a first sun gear S1; pairs of first pinion gears P1a and P1b meshing with each other; a first carrier C1 supporting the first pinion gears P1a, P1b such that each first pinion gear P1a, P1b is rotatable about its axis and about an axis of the first sun gear S1; and a first ring gear R1 meshing with the first sun gear S1 through the first pinion gears P1a and P1b. The first differential mechanism 38 is operable as a differential mechanism having a differential function, and employs a double-pinion type planetary gear set, so that a gear ratio ρ1 (described below) of the first differential mechanism 38 is adequately set. The second differential mechanism 40 is a known planetary gear mechanism of a single-pinion type which has: a second sun gear S2; a second pinion gear P2; a second carrier C2 supporting the second pinion gear P2 such that the second pinion gear P2 is rotatable about its axis and about an axis of the second sun gear S2; and a second ring gear R2 meshing with the second sun gear S2 through the second pinion gear P2. The second differential mechanism 40 is operable as a differential mechanism having a differential function.

In the first differential mechanism 38, the first carrier C1 is integrally connected to the input shaft 36, and functions as a first rotary element RE1 to which the engine 12 is operatively connected in a power transmittable manner through the input shaft 36 and which functions as an input rotary member of the differential mechanism 38. The first ring gear R1 is a second rotary element RE2 which is selectively connected to the casing 18 through the brake BR1. The first sun gear S1 is a third rotary element RE3 which is connected to an input rotary member (namely, the second ring gear R2) of the second differential mechanism 40, and which functions as an output rotary member of the first differential mechanism 38.

In the second differential mechanism 40, the second sun gear S2 is integrally connected to a rotor shaft 42 of the first motor/generator MG1, and functions as a reaction element which is a fourth rotary element RE4 to which the first motor/generator MG1 is operatively connected in a power transmittable manner. The second carrier C2 is connected to the output shaft 24 such that the second carrier C2 is rotated together with the output shaft 24. The second carrier C2 functions as an output element which is connected to the drive wheels 16, and is a fifth rotary element RE5 functioning as an output rotary member of the second differential mechanism 40. The second ring gear R2 is an input element which is connected to the output rotary member in the form of the first sun gear S1 of the first differential mechanism 38, and which is a sixth rotary element RE6 functioning as the input rotary member of the second differential mechanism 40.

The first carrier C1 and the first ring gear R1 are selectively connected to each other through the clutch CL1, while the first ring gear R1 and the second carrier C2 are selectively connected to each other through the clutch CLc. Thus, the clutch CL1 functions as the first coupling device for selectively connecting the first rotary element RE1 and the second rotary element RE2 to each other, while the clutch CLc functions as the second coupling device for selectively connecting the second rotary element RE2 and the fifth rotary element RE5 to each other. Further, the brake BR1 functions as the third coupling device for selectively connecting the second rotary element RE2 to the casing 18. Each of the clutch CL1, clutch CLc and brake BR1 is preferably a frictional coupling device of a wet-type, and a multiple-disk hydraulically operated frictional coupling device an operating state of which is controlled by a hydraulic actuator.

Figure 2:
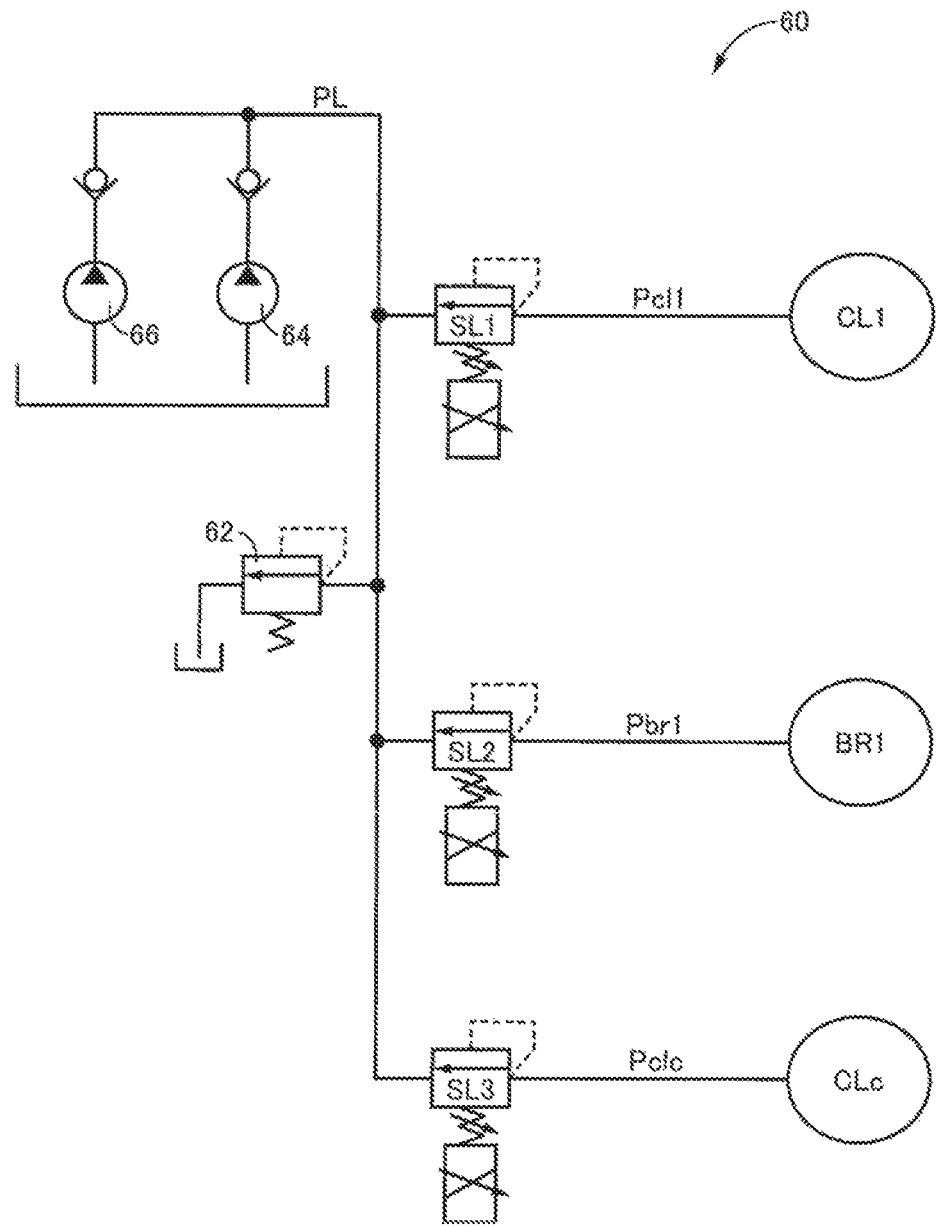
FIG. 2 is a view showing an example of major components of a hydraulic control unit for controlling operating states of coupling devices incorporated in the vehicular power transmitting system.

FIG. 2 is the view showing an example of major components of a hydraulic control unit 60 provided on the vehicle 10, for controlling the operating states (such as engaged state, released state, or the like) of coupling devices in the form of the clutch CL1, brake BR1 and clutch CLc. As shown in FIG. 2, the hydraulic control unit 60 incorporates a primary regulator valve 62, and linear solenoid-operated valves SL1-SL3. The primary regulator valve 62 regulates a line pressure PL by controlling a pressure of a working fluid generated by a mechanically operated oil pump 64 (MOP 64) or an electrically operated oil pump 66 (EOP 66) provided on the vehicle 10. The MOP 64 is connected to a rotary member (element) of the power transmitting system 14, which is rotated while the engine 12 is operated, so that the MOP 64 is operated by the engine 12, to pressurize the working fluid. The EOP 66 is operated by an electric motor (not shown) provided exclusively for the EOP 66, which is operated under the control of the electronic control device 90, to pressurize the working fluid while the engine 12 is held at rest, for instance, in a motor drive mode in which the engine 12 is held at rest. The linear solenoid-operated valve SL1 regulates a pressure of the working fluid applied to the clutch CL1 (CL1 hydraulic pressure Pcl1) by controlling the line pressure PL. The linear solenoid-operated valve SL2 regulates a pressure of the working fluid applied to the brake BR1 (BR1 hydraulic pressure Pbr1) by controlling the line pressure PL. The linear solenoid-operated valve SL3 regulates a pressure of the working fluid applied to the clutch CLc (CLc hydraulic pressure Pclc) by controlling the line pressure PL. The linear solenoid-operated valves SL1-SL3 are basically identical in construction with each other, and are selectively energized or de-energized, or controlled in terms of amounts of electric currents supplied thereto, independently of each other, by the electronic control device 90, so that the hydraulic pressures Pcl1, Pbr1 and Pclc are regulated independently of each other. The coupling devices in the form of the clutch CL1, brake BR1 and clutch CLc are selectively placed in their fully engaged state, fully released state or partially engaged state, according to the respective hydraulic pressures Pcl1, Pbr1 and Pclc applied thereto.

Referring back to FIG. 1, the first differential mechanism 38 can be selectively placed in one of four operating states, with the operating states of the clutch CL1 and the brake BR1 being suitably controlled. The four operating states consist of: a direct-engine-force-input state; an engine-input reversing state; a neutral state; and an internal locking state. Described in detail, the first differential mechanism 38 is placed in the direct-engine-force-input state when the clutch CL1 is placed in its fully engaged state. In this direct-engine-force-input state, all of the rotary elements of the first differential mechanism 38 are rotated as a unit while the first differential mechanism 38 is directly connected to the engine 12. In the fully engaged state of the brake BR1 in which a rotating speed (rpm) of the first ring gear R1 is zeroed, the first differential mechanism 38 is placed in the engine-input reversing state in which the first sun gear S1 (output rotary member of the first differential mechanism 38) is rotated in a negative direction opposite to a positive direction of operation of the engine 12 (having a positive operating speed Ne). In the fully released states of the clutch CL1 and the brake BR1, the first differential mechanism 38 is placed in the neutral state permitting its differential operation. In the fully engaged states of the clutch CL1 and the brake BR1, the first differential mechanism 38 is placed in the internal locking state in which its rotary elements are held stationary.

While the second differential mechanism 40 is permitted to perform its differential operation, the second differential mechanism 40 can function as a power distributing mechanism for distributing (splitting) the drive force of the engine 12 received by the second ring gear R2, to the first motor/generator MG1 and the second carrier C2. Accordingly, the vehicle 10 can be driven in an engine drive mode in which a reaction force against the engine torque Te received by the second ring gear R2 is received by the first motor/generator MG1. In the engine drive mode, the vehicle 10 can be driven with a torque (directly transmitted engine torque) mechanically transmitted from the engine 12 to the second carrier C2, and the MG2 torque Tm generated by the second motor/generator MG2 which is operated with an electric power generated by the first motor/generator MG1 operated with the drive force distributed thereto. Thus, the second differential mechanism 40 as a known electrically controlled differential portion (electrically controlled continuously variable transmission) a speed ratio of which is controlled with an operating state of the first motor/generator MG1 being controlled by controlling the electric power control unit 50 by the electronic control device 90. Namely, the second differential mechanism 40 is an electrically controlled transmission mechanism a differential state of which is controlled according to the controlled operating state of the first motor/generator MG1.

The first power transmitting portion 20 is operable as an electrically controlled continuously variable transmission a power distributing ratio of which is different from that of the second differential mechanism 40. That is, the first differential mechanism 38 and the second differential mechanism 40 in the first power transmitting portion 20 wherein the first sun gear S1 (third rotary element RE3) and the second ring gear R2 (sixth rotary element RE6) are connected to each other, cooperate to constitute one differential mechanism when the first ring gear R1 (second rotary element RE2) and the second carrier C2 (fifth rotary element RE5) are connected to each other in the engaged state of the clutch CLc.

In the first power transmitting portion 20, the first differential mechanism 38 which is selectively placed in one of the above-indicated four operating states, and the second differential mechanism 40 are connected to each other, so that the vehicle 10 can be driven in a plurality of drive modes described below, by controlling the operating states of the clutch CLc as well as the clutch CL1 and the brake BR1.

In the first power transmitting portion 20 configured as described above, the drive force of the engine 12 and the drive force of the first motor/generator MG1 are transmitted to the output shaft 24. That is, the engine 12 and the first motor/generator MG1 are operatively connected to the drive wheels 16 through the first power transmitting portion 20.

The second power transmitting portion 22 is disposed coaxially with the input shaft 36 (output shaft 24), and includes the second motor/generator MG2, and a speed reduction mechanism 44 connected to the output shaft 24. The speed reduction mechanism 44 is a known planetary gear mechanism of a single-pinion type including a third sun gear S3, a third pinion gear P3, and a third carrier C3, and a third ring gear R3 meshing with the third sun gear S3 through the third pinion gear P3. The third carrier C3 supports the third pinion gear P3 such that the third pinion gear P3 is rotatable about its axis and an axis of the third sun gear S3. The third sun gear S3 is an input rotary element connected to a rotor shaft 46 of the second motor/generator MG2. The third ring gear R3 is a reaction rotary element connected to the casing 18. The third carrier C3 is an output element connected to the output shaft 24. In the speed reduction mechanism 44 constructed as described above, a rotary motion of the second motor/generator MG2 is transmitted to the output shaft 24, such that an operating speed Nm of the second motor/generator MG2 is reduced to a rotating speed of the output shaft 24. In the second power transmitting portion 22, a drive force of the second motor/generator MG2 is transmitted to the output shaft 24, without transmission through the first power transmitting portion 20.

Thus, the second motor/generator MG2 is operatively connected to the drive wheels 16 in a power transmittable manner, without transmission through the first power transmitting portion 20. Namely, the second motor/generator MG2 is operatively connected in a power transmittable manner to an output rotary member of the power transmitting system 14 in the form of the drive axles 34, without transmission through the first power transmitting portion 20. The output rotary member of the power transmitting system 14 is a rotary member connected to the drive wheels 16. The output shaft 24 and the propeller shaft 26 as well as the drive axles 34 may also be considered as the output rotary member of the power transmitting system 14.

The thus constructed power transmitting system 14 is suitably used for the vehicle 10 of an FR type (front-engine rear-drive type). In this power transmitting system 14, the drive forces of the engine 12, the first motor/generator MG1 and the second motor/generator MG2 are transmitted to the drive wheels 16 through the output shaft 24, the differential gear device 32 and the drive axles 34, in this order of description.

The vehicle 10 is provided with the electronic control device 90 serving as the control apparatus for controlling the engine 12, power transmitting system 14 and other portions of the vehicle 10. The electronic control device 90 includes a so-called microcomputer incorporating a CPU, a RAM, a ROM and an input/output interface. The CPU performs signal processing operations according to control programs stored in the ROM while utilizing a temporary data storage function of the RAM, to implement various controls of the vehicle 10. For instance, the electronic control device 90 implements output controls of the engine 12, first motor/generator MG1 and second motor/generator MG2, and drive mode switching controls of the power transmitting system 14. The electronic control device 90 may consist of separate units including an engine control unit, a motor/generator control unit, and a hydraulic control unit.

The electronic control device 90 is configured to receive output signals of various sensors provided on the vehicle 10, such as: an output signal of an engine speed sensor 70 indicative of the engine speed Ne; an output signal of an output speed sensor 72 indicative of a rotating speed No of the output shaft 24, which corresponds to a running speed V of the vehicle 10; an output signal of an MG1 speed sensor 74 (e.g., a resolver) indicative of an operating speed Ng of the first motor/generator MG1; an output signal of an MG2 speed sensor 76 (e.g., a resolver) indicative of the operating speed Nm of the second motor/generator MG2; an output signal of an accelerator pedal operation amount sensor 78 indicative of an operation amount θacc of an accelerator pedal; an output signal of a shift position sensor 80 indicative of a presently selected one of operating positions POSsh of a shift lever such as a parking position P, a reverse drive position R, a neutral position N and a forward drive position D; and output signals of a battery sensor 82 indicative of a temperature THbat, a charging/discharging electric current Ibat and a voltage Vbat of the battery unit 52. The electronic control device 90 is further configured to generate output signals to be applied to various devices of the vehicle 10, such as: engine control command signals Se applied to an engine control device 54 to control a throttle actuator, a fuel injecting device, an igniting device and other devices of the engine 12; motor/generator control command signals Smg to be applied to the electric power control unit 50 to control the first motor/generator MG1 and the second motor/generator MG2; hydraulic control command signals Sp to be applied to the hydraulic control unit 60 to control the coupling devices, that is, the clutch CL1, brake BR1 and clutch CLc; and a pump drive control command signal Sop to be applied to the EOP 66 to operate the EOP 66. The electronic control device 90 calculates an amount SOC of the electric power stored in the battery unit 52 as a parameter representative of a charging state of the battery unit 52, on the basis of the charging/discharging electric current Ibat and the voltage Vbat.

The electronic control device 90 includes hybrid control means in the form of a hybrid control portion 92, and running state determining means in the form of a running state determining portion 96, in order to implement various controls of the vehicle 10.

The hybrid control portion 92 is configured to generate the engine control command signals Se for controlling the angle θ of opening of the throttle valve, the amount of injection of the fuel, a timing of the fuel injection, and the ignition timing, to thereby control the output of the engine 12 such that the engine torque Te coincides with a target value. The hybrid control portion 92 is further configured to generate the motor/generator control command signals Smg for controlling the operating states of the first motor/generator MG1 and the second motor/generator MG2. These motor/generator control command signals Smg are applied to the electric power control unit 50 to control the outputs of the first motor/generator MG1 and the second motor/generator MG2 such that the MG1 torque Tg and the MG2 torque Tm coincide with respective target values.

The hybrid control portion 92 is also configured to calculate a required vehicle drive torque on the basis of the accelerator pedal operation amount θacc and the vehicle running speed V, and to command at least one of the engine 12, first motor/generator MG1 and second motor/generator MG2 to generate the calculated required vehicle drive torque, while taking account of a required amount of charging of the battery unit 52, so that the vehicle 10 is driven with a high degree of fuel economy and with a reduced amount of emission of exhaust gases.

The hybrid control portion 92 includes drive mode control means in the form of a drive mode control portion 94. The drive mode control portion 94 is configured to selectively establish one of a motor drive mode (EV drive mode) and a hybrid drive mode (HV drive mode: also referred to as "engine drive mode"), according to a running state of the vehicle 10. In the EV drive mode, at least one of the first motor/generator MG1 and the second motor/generator MG2 is operated as a vehicle drive power source while the engine 12 is held at rest. In the HV drive mode (engine drive mode), at least the engine 12 is operated as the vehicle drive power source, so that at least the drive force of the engine 12 is transmitted to the drive wheels 16 to drive the vehicle 10. It is noted that the HV drive mode is considered to include a state of the vehicle 10 in which the vehicle 10 is not directly driven by the engine 12 while the engine 12 is driving and the first motor/generator MG1 is operated with the drive force of the engine 12 to generate an electric power which is primarily used to charge the battery unit 52.

The drive mode control portion 94 is configured to control the operating states of the clutch CL1, brake BR1 and clutch CLc, according to the drive mode selected by the hybrid control portion 92 so as to establish the drive mode. The drive mode control portion 94 applies the hydraulic control command signals Sp to the hydraulic control unit 60, for placing the clutch CL1, brake BR1 and clutch CLc in the engaged or released state, so that the vehicle drive force is transmitted to drive the vehicle 10 in the drive mode selected by the hybrid control portion 92.

As indicated in FIG. 3, the motor drive mode (EV drive mode) includes a plurality of sub-modes, and the engine drive mode (HV drive mode) includes a plurality of sub-modes. These sub-modes will be described by reference to FIGS. 4-16. FIG. 3 is the table indicating the operating states of the coupling devices (clutch CL1, brake BR1 and clutch CLc) in the different drive sub-modes of the vehicle 10. In the table, "o" indicates an engaged state of the coupling devices (clutch CL1, brake BR1 and clutch CLc), and a blank indicates a released state of the coupling devices, while "A" indicates an engaged state of at least one of the coupling devices (clutch CL1 or CLc) (depending on running status) in an engine braking state of the vehicle 10 in which the engine 12 placed in its non-operated state is forcibly driven with a reverse drive force transmitted from the drive wheels 16. Further, "G" indicates that the motor/generator (MG1 or MG2) is operated primarily as an electric generator, while "M" indicates that the motor/generator is operated primarily as an electric motor to drive the vehicle 10, or as an electric generator to perform a regenerative operation. As indicated in FIG. 3, the vehicle 10 is driven in a selected one of the EV drive mode and the HV drive mode. The EV drive mode includes two kinds of sub-modes: single-motor-drive EV drive sub-modes in which only the second motor/generator MG2 is used as the vehicle drive power source; and a two-motor-drive EV drive sub-mode in which both of the first motor/generator MG1 and the second motor/generator MG2 are used as the vehicle drive power source. The HV drive mode includes three sub-modes: an over-drive (O/D) input split HV drive sub-mode; an under-drive (U/D) input split HV drive sub-mode; and a fixed speed position sub-mode.

FIGS. 4-16 are the collinear charts indicating the relative rotating speeds of the rotary elements RE1-RE6 of the first differential mechanism 38 and the second differential mechanism 40. In these collinear charts, vertical lines Y1-Y4 which are spaced apart from each other in a horizontal direction and which are positioned in this order of description in a rightward direction indicate the rotating speeds of the rotary elements RE1-RE6. The vertical line Y1 represents the rotating speed of the fourth rotary element RE4 in the form of the second sun gear S2 connected to the first motor/generator MG1. The vertical line Y2 represents the rotating speed of the first rotary element RE1 in the form of the first carrier C1 connected to the engine 12 (represented as "ENG" in the collinear charts). The vertical line Y3 represents the rotating speed of the second rotary element RE2 in the form of the first ring gear R1 selectively connected to the casing 18 through the brake BR1, and the rotating speed of the fifth rotary element RE5 in the form of the second carrier C2 connected to the output shaft 24 (represented as "OUT" in the collinear charts). The vertical line Y4 represents the rotating speeds of the third rotary element RE3 in the form of the first sun gear S1 and the sixth rotary element RE6 in the form of the second ring gear R2, which are connected to each other. The output shaft 24 is connected to the second motor/generator MG2 through the speed reduction mechanism 44. In the collinear charts, an arrow-headed line extending from a white square mark "□" represents the MG1 torque Tg, and an arrow-headed line extending from a white circle mark "○" represents the engine torque Te, while an arrow-headed line extending from a black circle mark "●" represents the MG2 torque Tm. A non-hatched symbol of the clutch CL1 for selectively connecting the first carrier C1 and the first ring gear R1 indicates that the clutch CL1 is placed in its released state, while a hatched symbol of the clutch CL1 indicates that the clutch CL1 is placed in its engaged state. Further, a white diamond mark "◇" in connection with the brake BR1 for selectively connecting the first ring gear R1 to the casing 18 indicates that the brake BR1 is placed in its released state, while a black diamond mark "◆" in connection with the brake BR1 indicates that the brake BR1 is placed in its engaged state. A white diamond mark "◇" in connection with the clutch CLc for selectively connecting the first ring gear R1 and the second carrier C2 to each other indicates that the clutch CLc is placed in its released state, while a black diamond mark "◆" in connection with the clutch CLc indicates that the clutch CLc is placed in its engaged state. Further, broken lines represent the relative rotating speeds of the rotary elements of the first differential mechanism 38, while solid lines represent the relative rotating speeds of the rotary elements of the second differential mechanism 40. It is noted that the MG2 torque Tm represented by the arrow-headed line extending from the black circle mark "●" is the torque generated by the second motor/generator MG2 operated with an electric power generated by the first motor/generator MG1 operated with a portion of the drive force of the engine 12 distributed thereto, and/or an electric power supplied from the battery unit 52, but does not include a torque directly received from the engine 12. The black diamond mark "◆" overlapping the black circle mark "●" is not shown in the collinear charts. Distances between the adjacent ones of the vertical lines Y1, Y2, Y3 and Y4 are determined by gear ratios ρ1 and ρ2 of the differential mechanisms 38 and 40. Where a distance between the vertical lines representing the rotating speeds of the sun gear and the carrier is supposed to correspond to "1", a distance between the vertical lines representing the rotating speeds of the carrier and the ring gear corresponds to the gear ratio ρ of the relevant planetary gear device 38 or 40 (ρ=number of teeth of the sun gear/number of teeth of the ring gear).

Figure 4:
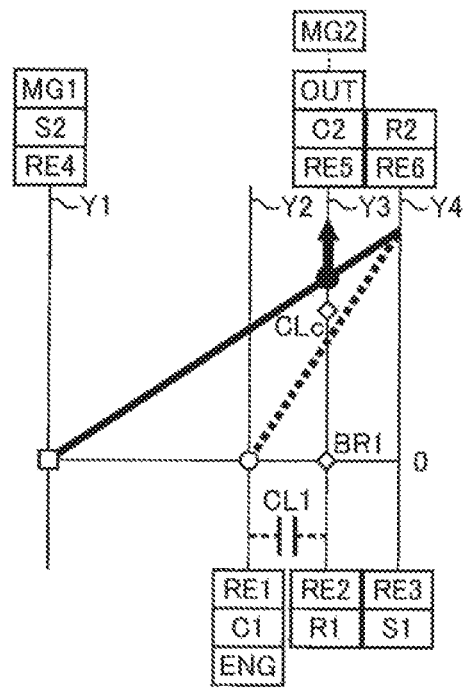
FIG. 4 is a collinear chart indicating relative rotating speeds of rotary elements of the vehicular power transmitting system when it is placed in its single-motor-drive EV forward drive sub-mode.

FIG. 4 is the collinear chart indicating relative rotating speeds of the rotary elements RE1-RE6 when the power transmitting system 14 is placed in its single-motor-drive EV drive sub-modes. In a normal sub-mode (represented as "NORMAL" in FIG. 3) of the single-motor-drive EV drive sub-mode, all of the clutch CL1, brake BR1 and clutch CLc are placed in the released states. In this normal sub-mode in which the clutch CL1 and the brake BR1 in the first differential mechanism 38 are placed in the released states, the first differential mechanism 38 is permitted to perform its differential function, and is placed in its neutral state. The hybrid control portion 92 commands the engine 12 to be held at rest, and commands the second motor/generator MG2 to generate the MG2 torque Tm. In the case of FIG. 4, the vehicle 10 is driven in the forward direction, with a positive torque of the second motor/generator MG2 operated in a positive direction (corresponding to a rotation direction of the second carrier C2 during forward driving of the vehicle 10). The vehicle 10 is driven in the rearward direction with the second motor/generator MG2 rotated in a negative direction, that is, in the direction opposite to the direction of rotation during forward running of the vehicle 10. During running of the vehicle 10, the second carrier C2 connected to the output shaft 24 is rotated in synchronization with the rotary motion of the second motor/generator MG2 (the rotary motions of the drive wheels 16). In the normal sub-mode of the single-motor-drive EV drive sub-mode in which the clutch CLc is also placed in the released state, the engine 12 and the first motor/generator MG1 are not forcibly driven and are held stationary, so that the engine speed Ne and the MG1 speed Ng are kept at zero. Accordingly, an energy loss due to dragging of the engine 12 and the first motor/generator MG1 is reduced, and an amount of consumption of electric power can be reduced. The hybrid control portion 92 implements a feedback control to keep the MG1 speed Ng at zero. Alternatively, the hybrid control portion 92 implements a d-axis locking control so as to control an electric current applied to the first motor/generator MG1 so that the MG1 speed Ng is kept at zero. Where the MG1 speed Ng can be held at zero with a cogging torque of the first motor/generator MG1 even when the MG1 torque Tg is kept at zero, the first motor/generator MG1 need not be controlled to generate the MG1 torque Tg. In the single-motor-drive EV drive sub-mode, the vehicle 10 can be driven with only the second motor/generator MG2 used as the vehicle drive power source, while the clutches CL1 and CLc are placed in their released states. It is noted that the control to keep the MG1 speed Ng at zero does not affect the vehicle drive torque, since the first power transmitting portion 20 is placed in its neutral state in which the first power transmitting portion 20 cannot withstand a reaction force against the MG1 torque Tg. Alternatively, the first motor/generator MG1 may be freely rotated in a non-load state, in the single-motor-drive EV drive sub-mode.

Figure 5:
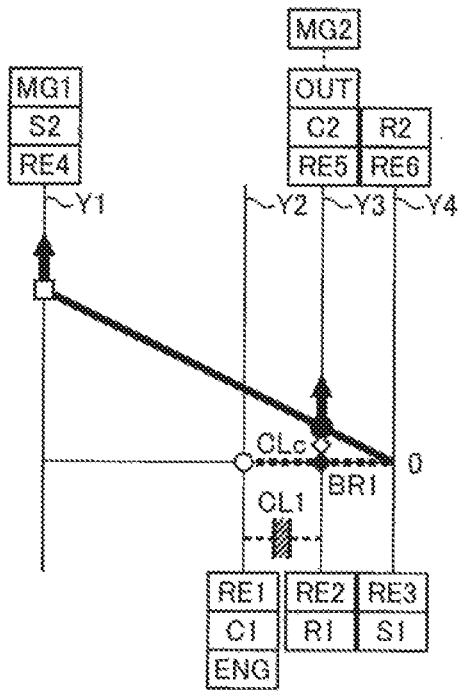
FIG. 5 is a collinear chart indicating the relative rotating speeds of the rotary elements when the vehicular power transmitting system is paced in its two-motor-drive EV forward drive sub-mode.

FIG. 5 is the collinear chart indicating the relative rotating speeds of the rotary elements RE1-RE6 when the power transmitting system 14 is placed in its two-motor-drive EV drive sub-mode. The two-motor-drive EV drive sub-mode (represented as "TWO-MOTOR DRIVE" in FIG. 3) is established in the engaged states of the clutch CL1 and the brake BR1, and in the released state of the clutch CLc. In the two-motor-drive EV drive sub-mode in which the clutch CL1 and the brake BR1 are placed in the engaged states, the differential operation of the first differential mechanism 38 is restricted, and the first ring gear R1 is held stationary. Accordingly, all of the rotary elements of the first differential mechanism 38 are held stationary, and the first differential mechanism 38 is placed in its internal locking state. Further, the second ring gear R2 connected to the first sun gear S1 is also held stationary, so that the second ring gear R2 can withstand a reaction force against the MG1 torque Tg, whereby a torque based on the MG1 torque Tg can be mechanically generated from the second carrier C2, and transmitted to the drive wheels 16. The hybrid control portion 92 commands the engine 12 to be held at rest, and commands the first motor/generator MG1 and the second motor/generator MG2 to generate the respective MG1 torque Tg and MG2 torque Tm. The collinear chart of FIG. 5 indicates the rotating speeds of the rotary elements RE1-RE6 when the vehicle 10 is driven in the forward direction, with the positive torques Tg and Tm generated by the respective first motor/generator MG1 and second motor/generator MG2 operated in the position direction. The vehicle 10 is driven in the rearward direction with the first and second motor/generators MG1 and MG2 rotated in a negative direction, that is, in the direction opposite to the direction of rotation during forward running of the vehicle 10.

As described above by reference to FIGS. 4 and 5, the vehicle 10 can be driven by only the second motor/generator MG2 in the single-motor-drive EV drive sub-mode, and by both of the first motor/generator MG1 and the second motor/generator MG2 in the two-motor-drive EV drive sub-mode. Accordingly, the vehicle 10 is driven by only the second motor/generator MG2 in the single-motor-drive EV drive sub-mode, while the vehicle 10 is in a low-load state, and by both of the first motor/generator MG1 and the second motor/generator MG2 in the two-motor-drive EV drive sub-mode, while the vehicle 10 is in a high-load state. It is noted that the second motor/generator MG2 is principally controlled to perform a regenerative operation during deceleration of the vehicle 10 even in the engine drive mode.

When the second motor/generator MG2 performs the regenerative operation during running of the vehicle 10 in the single-motor-drive EV drive sub-mode, the engine 12 held at rest is not forcibly driven and is held stationary with its speed Ne kept at zero, so that a large amount of electric power can be generated by the second motor/generator MG2. When the battery unit 52 is fully charged during running of the vehicle 10 in the single-motor-drive EV drive sub-mode, on the other hand, the battery unit 52 cannot be further charged with the electric power generated by the regenerative operation, so that a regenerative braking torque cannot be applied to the vehicle 10. When the battery unit 52 is fully charged in the single-motor-drive EV drive sub-mode so that the regenerative operation is not permitted, it is considered possible to apply an engine brake to the vehicle 10. When the battery unit 52 is not fully charged but is almost fully or considerably charged in the single-motor-drive EV drive sub-mode, it is considered possible to apply an assisting engine braking torque to the vehicle 10, in addition to the regenerative braking torque. When the electric power amount SOC stored in the battery unit 52 is so small that a sufficiently large amount of electric power cannot be supplied to the second motor/generator MG2 during running of the vehicle 10 in the single-motor-drive EV drive sub-mode, the second motor/generator MG2 cannot be operated as needed. In this case, it is considered possible to switch the drive mode from the EV drive mode to the engine drive mode (HV drive mode). In view of the situations described above, the EV drive mode includes standby sub-modes for quick application of the engine brake or for preparation for quick switching to the engine drive mode, and an assisting engine braking sub-mode in which the assisting engine braking torque is applied to the vehicle 10, in addition to the regenerative braking torque.

Figure 6:
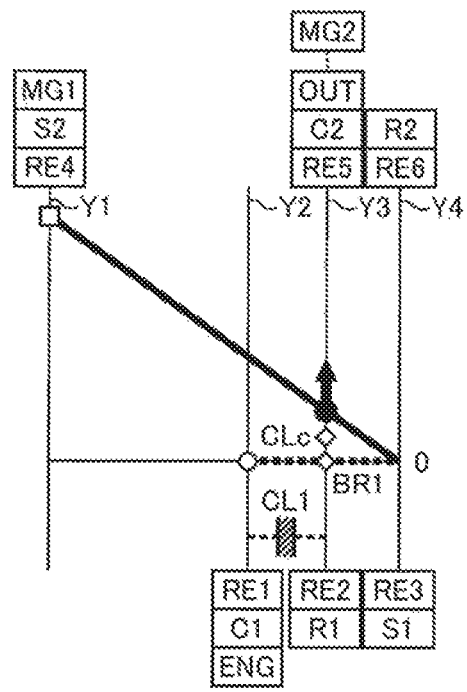
FIG. 6 is a collinear chart indicating the relative rotating speeds of the rotary elements when the vehicular power transmitting system is placed in its U/D input split standby sub-mode.
Figure 7:
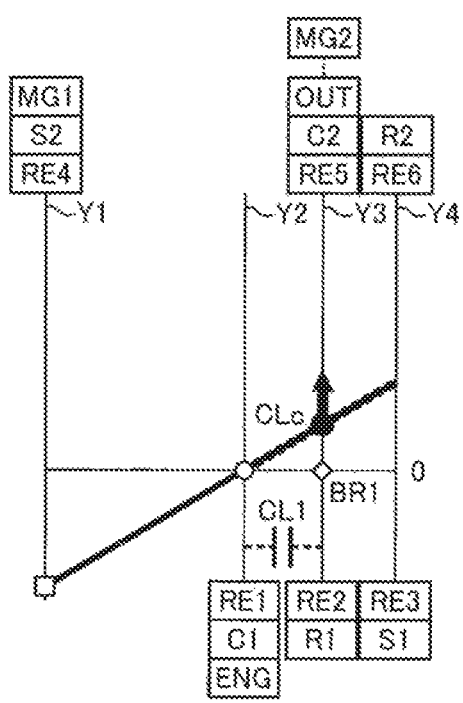
FIG. 7 is a collinear chart indicating the relative rotating speeds of the rotary elements when the vehicular power transmitting system is placed in its O/D input split standby sub-mode.

FIGS. 6 and 7 are the collinear charts indicating the relative rotating speeds of the rotary elements RE1-RE6 when the power transmitting system 14 is placed in its standby sub-modes of the EV drive mode. As indicated in the table of FIG. 3, the standby sub-modes (represented as "STANDBY SUB-MODES" in the table) are established in the engaged state of the clutch CL1 or the clutch CLc. While the engine 12 is forcibly driven in the engaged state of the clutch CL1 or CLc, the first motor/generator MG1 is freely rotatable in a non-load state in the standby sub-modes, so that the engine 12 held at rest is held stationary in the standby sub-modes. In the standby sub-modes, therefore, the second motor/generator MG2 can be operated as an electric motor to drive the vehicle 10 or to perform a regenerative operation, without application of an engine brake to the vehicle 10. When the engine speed Ne is raised by the first motor/generator MG1 in the standby sub-modes, the first motor/generator MG1 can withstand a reaction force against the engine torque Te (negative value), so that an engine brake according to the engine speed Ne can be applied to the vehicle 10. Further, when the engine 12 is ignited after the engine speed Ne has been raised by the first motor/generator MG1 in the standby sub-modes, the vehicle drive mode can be switched to the engine drive mode.

The operating states of the coupling devices (clutch CL1, brake BR1 and clutch CLc) in the standby sub-mode in which the clutch CL1 is placed in the engaged state as indicated in FIG. 6 are the same as in a U/D input split HV forward drive sub-mode described below. The standby sub-mode in which the clutch CL1 is placed in the engaged state and the engine 12 is held at rest will be referred to as a "U/D input split standby EV drive sub-mode".

The operating states of the coupling devices (clutch CL1, brake BR1 and clutch CLc) in the standby sub-mode in which the clutch CLc is placed in the engaged state as indicated in FIG. 7 are the same as in an O/D input split HV forward drive sub-mode described below. The standby sub-mode in which the clutch CLc is placed in the engaged state and the engine 12 is held at rest will be referred to as an "O/D input split standby EV drive sub-mode".

Figure 8:
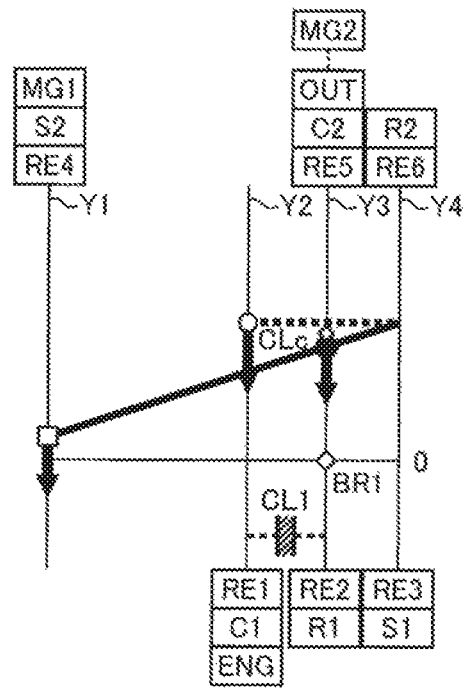
FIG. 8 is a collinear chart indicating the relative rotating speeds of the rotary elements when the vehicular power transmitting system is placed in its U/D input split engine-braking EV drive sub-mode.
Figure 9:
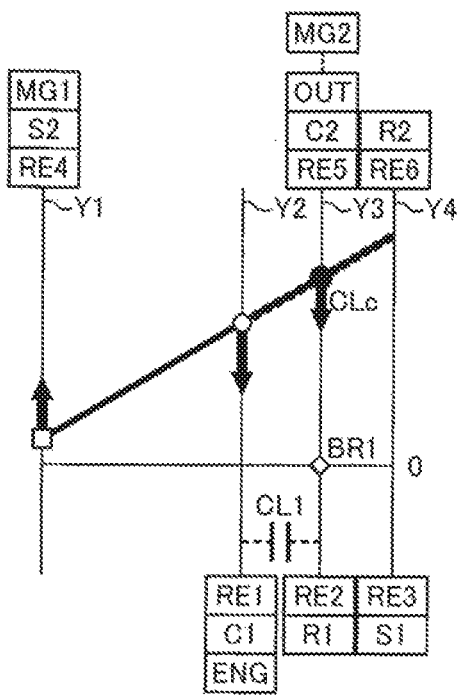
FIG. 9 is a collinear chart indicating the relative rotating speeds of the rotary elements when the vehicular power transmitting system is placed in its O/D input split engine-braking EV drive sub-mode.

FIGS. 8 and 9 are the collinear charts indicating the relative rotating speeds of the rotary elements RE1-RE6 when the power transmitting system 14 is placed in its engine-braking EV drive sub-modes. These engine-braking EV drive sub-modes (represented as "ASSISTING ENGINE BRAKING" in FIG. 3) are established in the engaged state of the clutch CL1 or CLc. Since the engine 12 is forcibly driven in the engaged state of the clutch CL1 or CLc, the first motor/generator MG1 can withstand a reaction force against the engine torque Te (negative value) while controlling the engine speed Ne, in the engine-braking EV drive sub-modes, so that an engine brake according to the engine speed Ne can be applied to the vehicle 10. In the engine-braking EV drive sub-modes, therefore, the engine brake can be applied to the vehicle 10, in addition to or in place of a regenerative brake by the second motor/generator MG2. Further, an engine brake can be applied to the vehicle 10 by placing the clutch CL1 or CLc in the engaged state, without a need of the first motor/generator MG1 to withstand the reaction force against the engine torque Te (negative value). The operating states of the coupling devices CL1, BR1 and CLc in the engine-braking EV drive sub-modes in which the clutch CL1 and the clutch CLc are engaged, are the same as in a fixed-speed-position direct-engine-force-input HV drive sub-mode described below.

The operating states of the coupling devices CL1, BR1 and CLc in the engine-braking EV drive sub-mode in which the clutch CL1 is placed in the engaged state as indicated in FIG. 8 are the same as in a U/D input split HV forward drive sub-mode described below. The engine-braking EV drive sub-mode in which the clutch CL1 is placed in the engaged state and the engine 12 is held at rest will be referred to as a "U/D input split engine-braking EV drive sub-mode".

The operating states of the coupling devices CL1, BR1 and CLc in the engine-braking EV drive sub-mode in which the clutch CLc is placed in the engaged state as indicated in FIG. 9 are the same as in an O/D input split HV forward drive sub-mode described below. The engine-braking EV drive sub-mode in which the clutch CLc is placed in the engaged state will be referred to as an "O/D input split engine-braking EV drive sub-mode".

Thus, the vehicle 10 can be driven in a selected one of: a first engine-braking drive mode in the form of the U/D input split engine-braking EV drive sub-mode which is established in the engaged state of the first coupling device in the form of the clutch CL1 and in which a braking torque of the engine. 12 is applied to the vehicle 10; and a second engine-braking drive mode in the form of the O/D input split engine-braking EV drive sub-mode which is established in the engaged state of the second coupling device in the form of the clutch CLc and in which a braking torque of the engine 12 is applied to the vehicle 10. It is noted that the first and second engine-braking drive modes may include sub-modes of the HV drive mode (engine drive mode) which will be described in detail.

Figure 10:
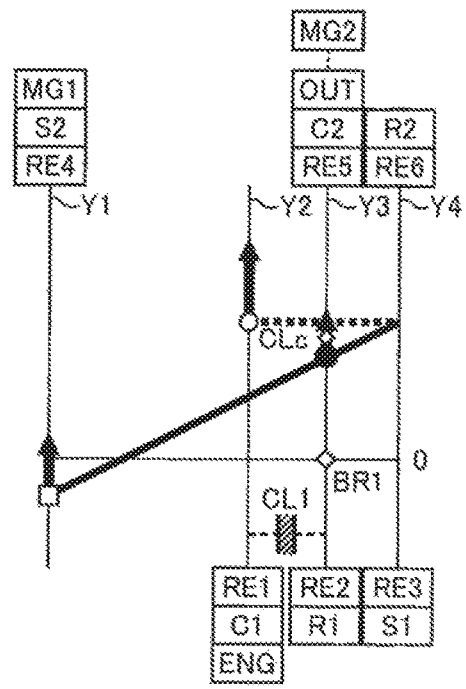
FIG. 10 is a collinear chart indicating the relative rotating speeds of the rotary elements when the vehicular power transmitting system is placed in its U/D input split HV forward drive sub-mode.

FIG. 10 is the collinear chart indicating the relative rotating speeds of the rotary elements RE1-RE6 when the power transmitting system 14 is placed in its U/D input split HV forward drive sub-mode. The U/D input split HV forward drive sub-mode (represented as "U/D INPUT SPLIT" and "FORWARD DRIVE" in FIG. 3) is established in the engaged state of the clutch CL1 and in the released states of the brake BR1 and the clutch CLc. In the U/D input split HV forward drive sub-mode in which the clutch CL1 is placed in the engaged state while the brake BR1 is placed in the released state, the first differential mechanism 38 is connected directly to the engine 12 such that the drive force of the engine 12 received by the first carrier C1 is transmitted directly to the second ring gear R2 connected to the first sun gear S1. In addition, the second differential mechanism 40 alone functions as an electrically controlled continuously variable transmission, in the U/D input split HV forward drive sub-mode in which the clutch CLc is placed in the released state. In the first power transmitting portion 20, therefore, the drive force of the engine 12 received by the second ring gear R2 can be distributed to the second sun gear S2 and the second carrier C2. Namely, the first motor/generator MG1 receives the reaction force against the engine torque Te transmitted to the second ring gear R2 in the first power transmitting portion 20, so that the engine torque Te is mechanically transmitted directly to the second carrier C2, and an electric power generated by the first motor/generator MG1 operated with a portion of the drive force of the engine 12 distributed thereto is supplied to the second motor/generator MG2 through a suitable electric path. The hybrid control portion 92 commands the engine 12 to be operated (started), and commands the first motor/generator MG1 to operate as an electric generator for generating the MG1 torque Tg corresponding to the reaction force against the engine torque Te, so that the second motor/generator MG2 is operated with the electric power generated by the first motor/generator MG1, to generate the MG2 torque Tm. The hybrid control portion 92 may command the second motor/generator MG2 to be operated with a sum of the electric power generated by the first motor/generator MG1 and an electric power supplied from the battery unit 52. In the example of FIG. 10, the vehicle 10 is driven in the forward direction with a positive torque generated by the second motor/generator MG2 operated in a positive direction.

Figure 11:
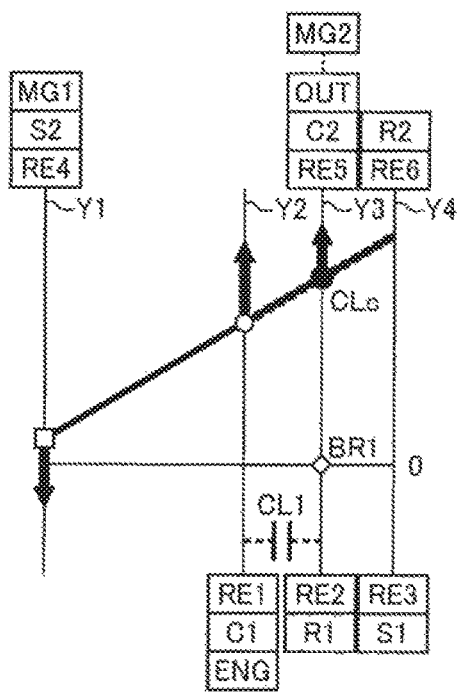
FIG. 11 is a collinear chart indicating the relative rotating speeds of the rotary elements when the vehicular power transmitting system is placed in its O/D input split HV forward drive sub-mode.

FIG. 11 is the collinear chart indicating the relative rotating speeds of the rotary elements RE1-RE6 when the power transmitting system 14 is placed in its O/D input split HV forward drive sub-mode. The O/D input split HV forward drive sub-mode (represented as "O/D INPUT SPLIT" and "FORWARD DRIVE" in FIG. 3) is established in the released states of the clutch CL1 and the brake BR1 and in the engaged state of the clutch CLc. In the O/D input split HV forward drive sub-mode in which the clutch CLc is placed in the engaged state, the first differential mechanism 38 and the second differential mechanism 40 cooperate to function as a single differential device. In addition, in the O/D input split HV forward drive sub-mode in which the clutch CL1 and the brake BR1 are placed in the released states, the first differential mechanism 38 and the second differential mechanism 40 cooperate to function as an electrically controlled continuously variable transmission a proportion of distribution of the engine drive force of which is different from that of the second differential mechanism 40 alone. In the first power transmitting portion 20, therefore, the drive force of the engine 12 received by the first carrier C1 can be distributed to the second sun gear S2 and the second carrier C2. Namely, the first motor/generator MG1 can receive the reaction force against the engine torque Te transmitted to the first carrier C1 in the first power transmitting portion 20, so that the engine torque Te is mechanically transmitted directly to the second carrier C2, and an electric power generated by the first motor/generator MG1 operated with a portion of the drive force of the engine 12 distributed thereto is supplied to the second motor/generator MG2 through a suitable electric path. The hybrid control portion 92 commands the engine 12 to be operated (started), and commands the first motor/generator MG1 to operate as an electric generator for generating the MG1 torque Tg corresponding to the reaction force against the engine torque Te, so that the second motor/generator MG2 is operated with the electric power generated by the first motor/generator MG1, to generate the MG2 torque Tm. In the example of FIG. 10, the vehicle 10 is driven in the forward direction with a positive torque generated by the second motor/generator MG2 operated in a positive direction.

Figure 12:
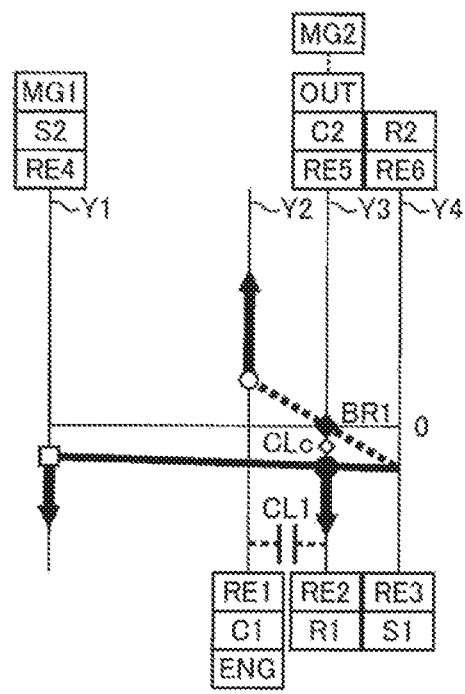
FIG. 12 is a collinear chart indicating the relative rotating speeds of the rotary elements when the vehicular power transmitting system is placed in its U/D input split HV reverse drive sub-mode, with a reverse input of an engine drive force.

FIG. 12 is the collinear chart indicating the relative rotating speeds of the rotary elements RE1-RE6 when the power transmitting system 14 is placed in its U/D input split HV reverse drive sub-mode, with a reverse input of the drive force of the engine 12, that is, while a negative torque of the engine 12 operating in a negative direction is applied to the power transmitting system 14 functioning as an electrically controlled continuously variable transmission. The U/D input split HV reverse drive sub-mode with the reverse input of the engine drive force (represented as "U/D INPUT SPLIT", "REVERSE DRIVE" and "REVERSE ENGINE DRIVE FORCE INPUT" in FIG. 3) is established in the engaged state of the brake BR1 and in the released states of the clutch CL1 and clutch CLc. In the U/D input split HV reverse drive sub-mode with the reverse engine drive force input in which the clutch CL1 is placed in the released state while the brake BR1 is placed in the engaged state, the first differential mechanism 38 receives the drive force of the engine 12 so as to generate a reverse vehicle drive force, so that the drive force of the engine 12 received by the first carrier C1 is transmitted to the second ring gear R2 connected to the first sun gear S1, such that the second ring gear R2 is rotated in a negative direction with a negative torque. In addition, the second differential mechanism 40 alone functions as an electrically controlled continuously variable transmission, in the U/D input split HV reverse drive sub-mode in which the clutch CLc is placed in the released state. In the first power transmitting portion 20, therefore, the reverse drive force of the engine 12 received by the second ring gear R2 can be distributed to the second sun gear S2 and the second carrier C2. The hybrid control portion 92 commands the engine 12 to be operated (started), and commands the first motor/generator MG1 to operate as an electric motor for generating the MG1 torque Tg corresponding to the reaction force against the engine torque Te, so that the second motor/generator MG2 is operated with the electric power stored in the battery unit 52, to generate the MG2 torque Tm. In the example of FIG. 12, the vehicle 10 is driven in the reverse direction with a negative torque generated by the second motor/generator MG2 operated in a negative direction. In the U/D input split HV reverse drive sub-mode in which the drive force of the engine 12 is transmitted to the second ring gear R2 such that the second ring gear R2 is rotated in the negative direction with the negative torque, the vehicle 10 can be driven in the reverse direction with the reverse driving torque transmitted from the second ring gear R2, in addition to the MG2 torque Tm. It is noted that the second motor/generator MG2 may be operated in the negative direction to generate a positive torque for an electric power for operating the first motor/generator MG1 to generate a vehicle driving torque. In this case, too, the vehicle 10 can be driven in the reverse direction, since the absolute value of the negative engine torque directly transmitted to the first differential mechanism 38 is larger than the absolute value of the MG2 torque Tm.

Figure 13:
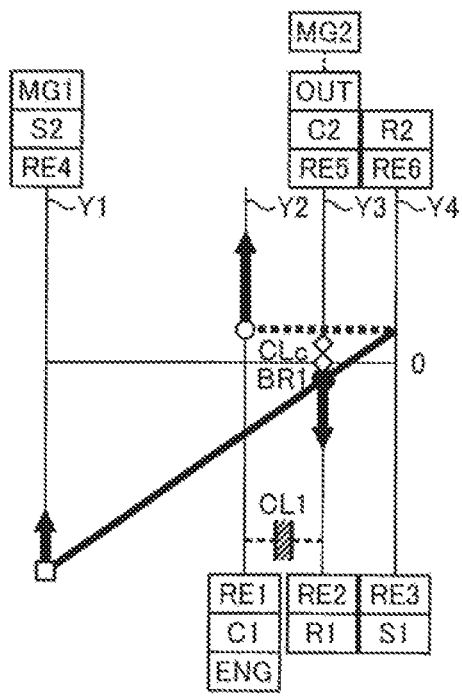
FIG. 13 is a collinear chart indicating the relative rotating speeds of the rotary elements when the vehicular power transmitting system is placed in its U/D input split HV reverse drive sub-mode, with a forward input of the engine drive force.

FIG. 13 is the collinear chart indicating the relative rotating speeds of the rotary elements RE1-RE6 when the power transmitting system 14 is placed in its U/D input split HV reverse drive sub-mode, with a forward input of the drive force of the engine 12. The U/D input split HV reverse drive sub-mode with the forward input of the engine drive force (represented as "U/D INPUT SPLIT", "REVERSE DRIVE" and "FORWARD ENGINE DRIVE FORCE INPUT" in FIG. 3) is established in the engaged state of the clutch CL1 and in the released states of the brake BR1 and the clutch CLc. In the U/D input split HV reverse drive sub-mode with the forward engine drive force input in which the clutch CL1 is placed in the engaged state while the brake BR1 is placed in the released state, the first differential mechanism 38 is connected directly to the engine 12 such that the drive force of the engine 12 received by the first carrier C1 is transmitted directly to the second ring gear R2 connected to the first sun gear S1. In addition, the second differential mechanism 40 alone functions as an electrically controlled continuously variable transmission, in the U/D input split HV reverse drive sub-mode with the forward engine drive force input in which the clutch CLc is placed in the released state. In the first power transmitting portion 20, therefore, the drive force of the engine 12 received by the second ring gear R2 can be distributed to the second sun gear S2 and the second carrier C2. The hybrid control portion 92 commands the engine 12 to be operated (started), and commands the first motor/generator MG1 to operate as an electric generator for generating the MG1 torque Tg corresponding to the reaction force against the engine torque Te, so that the second motor/generator MG2 is operated with the electric power generated by the first motor/generator MG1, to generate the MG2 torque Tm. In the example of FIG. 13, the vehicle 10 is driven in the reverse direction with a negative torque generated by the second motor/generator MG2 operated in a negative direction. It is noted that while the positive engine torque is directly transmitted to the first differential mechanism 38, the vehicle 10 can be driven in the reverse direction since the absolute value of a negative output torque of the second motor/generator MG2 operated by the electric power generated by the first motor/generator MG1 (or by the electric power generated by the first motor/generator MG1 and an electric power supplied from the battery unit 52) is larger than the absolute value of the directly transmitted positive engine torque.

Figure 14:
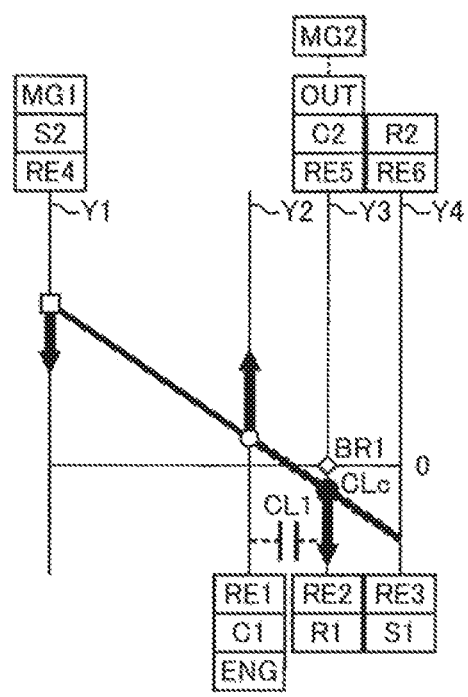
FIG. 14 is a collinear chart indicating the relative rotating speeds of the rotary elements when the vehicular power transmitting system is placed in its O/D input split HV reverse drive sub-mode, with a forward input of the engine drive force.

FIG. 14 is the collinear chart indicating the relative rotating speeds of the rotary elements RE1-RE6 when the power transmitting system 14 is placed in its O/D input split HV reverse drive sub-mode, with a forward input of the drive force of the engine 12. The O/D input split HV reverse drive sub-mode with the forward input of the engine drive force (represented as "O/D INPUT SPLIT", "REVERSE DRIVE" and "FORWARD ENGINE DRIVE FORCE INPUT" in FIG. 3) is established in the released states of the clutch CL1 and the brake BR1 and in the engaged state of the clutch CLc. In the O/D input split HV reverse drive sub-mode with the forward engine drive force input in which the clutch CLc is placed in the engaged state, the first differential mechanism 38 and the second differential mechanism 40 cooperate to function as a single differential device. In addition, in the O/D input split HV reverse drive sub-mode with the forward engine drive force input in which the clutch CL1 and the brake BR1 are placed in the released states, the first differential mechanism 38 and the second differential mechanism 40 cooperate to function as an electrically controlled continuously variable transmission a proportion of distribution of the engine drive force of which is different from that of the second differential mechanism 40 alone. In the first power transmitting portion 20, therefore, the drive force of the engine 12 received by the first carrier C1 can be distributed to the second sun gear S2 and the second carrier C2. The hybrid control portion 92 commands the engine 12 to be operated (started), and commands the first motor/generator MG1 to operate as an electric generator for generating the MG1 torque Tg corresponding to the reaction force against the engine torque Te, so that the second motor/generator MG2 is operated with the electric power generated by the first motor/generator MG1, to generate the MG2 torque Tm. In the example of FIG. 14, the vehicle 10 is driven in the reverse direction with a negative torque generated by the second motor/generator MG2 operated in a negative direction. It is noted that while the directly transmitted engine torque is positive, the vehicle 10 can be driven in the reverse direction in this O/D input split HV reverse drive sub-mode (with the forward engine drive force input), as in the U/D input split HV reverse drive sub-mode (with the forward engine drive force input).

As described above by reference to FIGS. 10-14, when the first power transmitting portion 20 functions as the electrically controlled continuously variable transmission, the selected rotary elements of the first power transmitting portion 20 to which the drive force of the engine 12 is distributed in the U/D input split HV drive sub-modes are different from those in the O/D input split HV drive sub-modes, and the proportion of distribution of the engine drive force to the selected rotary elements in the U/D input split HV drive sub-modes is different from that in the O/D input split HV drive sub-modes. Namely, the ratios of the output torques and operating speeds of the first motor/generator MG1 and the second motor/generator MG2 with respect to the output torque and the operating speed of the engine 12 can be changed depending upon whether the O/D input split HV drive sub-modes or the U/D input split HV drive sub-modes are established. The operating state of the clutch CLc is changed to change the ratios of the output torques and operating speeds of the motor/generator MG1 and motor/generator MG2 to those of the engine 12, in the engine drive mode (HV drive mode).

In a so-called "mechanical point state" of the power transmitting system 14, the drive force of the engine 12 is entirely mechanically transmitted to the second carrier C2, without transmission through an electric power transmitting path involving electric power supply and reception to and from the first motor/generator MG1 and the second motor/generator MG2, while the MG1 speed Ng is held at zero. When the rotary motion of the engine 12 is output from the second carrier C2 after the operating speed of the engine 12 is reduced, in the mechanical point state, the power transmitting system 14 is placed in the U/D (under-drive) input split HV drive sub-modes. When the rotary motion of the engine 12 is output from the second carrier C2 after the operating speed of the engine 12 is raised, in the mechanical point state, the power transmitting system 14 is placed in the O/D (over-drive) input split HV drive sub-modes. It is noted that the torque directly transmitted from the engine 12 to the second carrier C2 in the U/D input split HV drive sub-modes is increased with respect to the engine torque Te, while the torque directly transmitted from the engine 12 to the second carrier C2 in the O/D input split HV drive sub-modes is reduced with respect to the engine torque Te.

In the U/D input split HV forward drive sub-mode, the U/D input split forward-engine-force-input HV, reverse drive sub-mode, and the U/D input split engine-braking EV drive sub-mode, a torque larger than the engine torque Te is mechanically transmitted to the second carrier C2, while the differential state of the second differential mechanism 40 is controlled with the operating state of the first motor/generator MG1 being controlled in the engaged state of the clutch CL1 and in the released state of the clutch CLc such that the second differential mechanism 40 is operated as an electrically controlled continuously variable transmission. In the O/D input split HV forward drive sub-mode, the O/D input split forward-engine-force-input HV reverse drive sub-mode, and the O/D input split engine-braking EV drive sub-mode, on the other hand, a torque smaller than the engine torque Te is mechanically transmitted to the second carrier C2, while the differential state of the second differential mechanism 40 is controlled with the operating state of the first motor/generator MG1 being controlled in the released state of the clutch CL1 and in the engaged state of the clutch CLc. In the U/D input split reverse-engine-force-input HV reverse drive sub-mode, a torque larger than the engine torque Te is mechanically transmitted to the second carrier C2, while the second differential mechanism 40 is operated as an electrically controlled continuously variable transmission.

Figure 15:
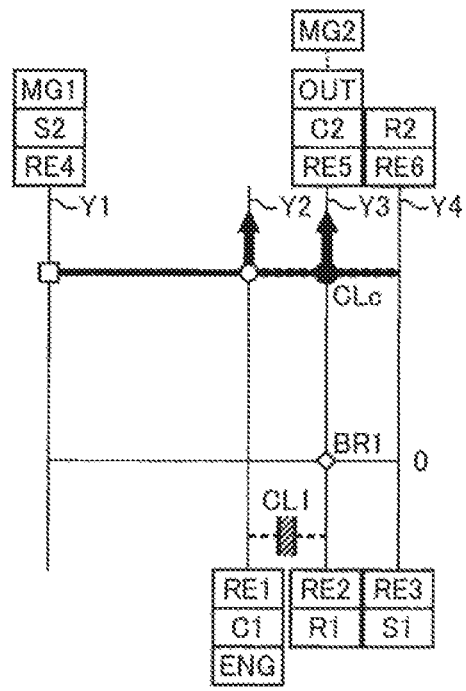
FIG. 15 is a collinear chart indicating the relative rotating speeds of the rotary elements when the vehicular power transmitting system is placed in its fixed-speed-position direct-engine-force-input HV drive sub-mode.

FIG. 15 is the collinear chart indicating the relative rotating speeds of the rotary elements RE1-RE6 when the power transmitting system 14 is placed in its fixed-speed-position direct-engine-force-input HV drive sub-mode while the rotary elements of each of the first and second differential mechanisms 38 and 40 are rotated as a unit; The fixed-speed-position direct-engine-force-input HV drive sub-mode (represented as "FIXED SPEED POSITION", "FORWARD DRIVE" and "DIRECT ENGINE FORCE INPUT" in FIG. 3) is established in the engaged states of the clutch CL1 and the clutch CLc, and in the released state of the brake BR1. In this fixed-speed-position direct-engine-force-input HV drive sub-mode in which the clutch CL1 is placed in the engaged state and the brake BR1 is placed in the released state, the first differential mechanism 38 is directly connected to the engine 12, and the rotary elements of each of the first differential mechanism 38 and the second differential mechanism 40 are rotated as a unit. Accordingly, the drive force of the engine 12 can be directly transmitted from the second carrier C2 through the first power transmitting portion 20. The hybrid control portion 92 commands the engine 12 to generate the vehicle driving engine torque Te. In the fixed-speed-position direct-engine-force-input HV drive sub-mode, the drive force of the first motor/generator MG1 operated with an electric power supplied from the battery unit 52 can also be transmitted directly to the second carrier C2, and the drive force of the second motor/generator MG2 operated with the electric power supplied from the battery unit 52 can also be transmitted to the drive wheels 16. Accordingly, the hybrid control portion 92 may command at least one of the first motor/generator MG1 and the second motor/generator MG2 to generate the vehicle driving torque, in addition to the engine torque Te. Namely, in the fixed-speed-position direct-engine-force-input HV drive sub-mode, the vehicle 10 may be driven with only the drive force of the engine 12, or together with an assisting torque generated by the first motor/generator MG1 and/or the second motor/generator MG2. In the fixed-speed-position direct-engine-force-input HV drive sub-mode in which both of the clutches CL1 and CLc are placed in the engaged states, the engine torque Te can be output directly from the second carrier C2 while all of the rotating elements of the first and second differential mechanisms 38 and 40 are rotated as a unit.

Figure 16:
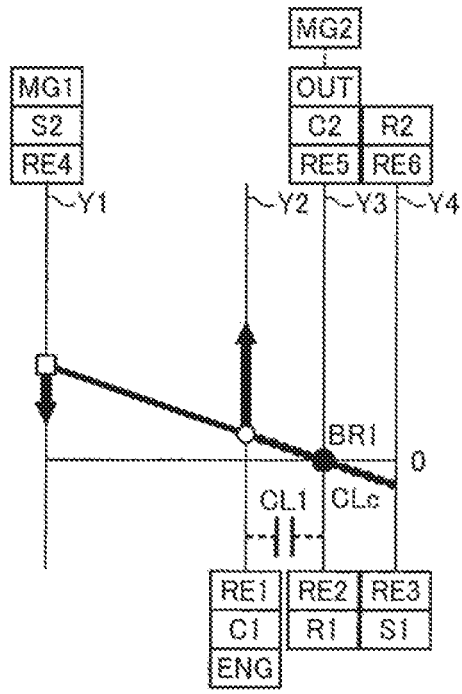
FIG. 16 is a collinear chart indicating the relative rotating speeds of the rotary elements when the vehicular power transmitting system is placed in its fixed-speed-position stationary-output-shaft HV drive sub-mode.

FIG. 16 is the collinear chart indicating the relative rotating speeds of the rotary elements RE1-RE6 when the power transmitting system 14 is placed in its fixed-speed-position stationary-output-shaft HV drive sub-mode, namely, while the second carrier C2 is held stationary. The fixed-speed-position stationary-output-shaft HV drive sub-mode (represented as "FIXED SPEED POSITION", "FORWARD DRIVE" and "STATIONARY OUTPUT SHAFT" in FIG. 3) is established in the engaged states of the brake BR1 and the clutch CLc and in the released state of the clutch CL1. In the fixed-speed-position stationary-output-shaft HV drive sub-mode in which the clutch CLc is placed in the engaged state, the first differential mechanism 38 and the second differential mechanism 40 cooperate to constitute one differential mechanism. In addition, the second carrier C2 is held stationary in the fixed-speed-position stationary-output-shaft HV drive sub-mode in which the brake BR1 is placed in the engaged state and the clutch CL1 is placed in the released state. In the first power transmitting portion 20, therefore, the first motor/generator MG1 can withstand the reaction force against the drive force of the engine 12 transmitted to the first carrier C1, so that the battery unit 52 can be charged with an electric power generated by the first motor/generator MG1 operated with the drive force of the engine 12. The hybrid control portion 92 commands the engine 12 to be operated (started), and commands the first motor/generator MG1 to be operated as an electric generator to generate the electric power for charging the battery unit 52 through the electric power control unit 50 while the reaction force is generated. The present fixed-speed-position stationary-output-shaft HV drive sub-mode in which the second carrier C2 is held stationary is an HV drive sub-mode exclusively used to charge the battery unit 52 while the vehicle 10 is held stationary. As described above by reference to FIGS. 15 and 16, the clutch CLc is placed in the engaged state in the fixed-speed-position direct-engine-force-input HV drive sub-mode and the fixed-speed-position stationary-output-shaft HV drive sub-mode.

When a speed reduction ratio I (=Ne/No) of the first power transmitting portion 20 is comparatively high, an absolute value of an output ratio Pg/Pe of an MG1 power Pg of the first motor/generator MG1 to an engine power Pe of the engine 12, and an absolute value of an output ratio Pm/Pe of an MG2 power Pm of the second motor/generator MG2 to the engine power Pe are lower in the U/D input split HV drive sub-modes than in the O/D input split HV drive sub-modes. When the speed reduction ratio I is comparatively high, therefore, an increase of the MG1 power Pg and an increase of the MG2 power Pm can be restricted in the U/D input split HV drive sub-modes. When the speed reduction ratio I is comparatively low, such as lower than 1, on the other hand, the output ratio Pm/Pe is a negative value (namely, the output ratio Pg/Pe is a positive value), so that the absolute values of the output ratios Pm/Pe and Pg/Pe are higher in the U/D input split HV drive sub-modes than in the O/D input split HV drive sub-modes. When the output ratio Pm/Pe is negative (namely, when the output ratio Pg/Pe is positive), the power transmitting system 14 is placed in a drive force circulating state in which the second motor/generator MG2 is operated as an electric generator to generate an electric power to be supplied to the first motor/generator MG1. However, it is desirable to prevent from this drive force circulating state as much as possible. Accordingly, an amount of power required in the drive force circulating state can be reduced by establishing the O/D input split HV drive sub-modes when the speed reduction ratio I is comparatively low. By suitably switching the HV drive mode between the U/D input split HV drive sub-modes and the O/D input split HV drive sub-modes according to the speed reduction ratio I, the power of the engine 12 can be transmitted with reduced outputs of the motor/generator MG1 and the motor/generator MG2.

That is, it is desirable to selectively establish the U/D input split HV drive sub-modes and the O/D input split HV drive sub-modes such that the U/D input split HV drive sub-modes are established in a high-load state of the engine 12 in which the speed reduction ratio I is comparatively high, while the O/D input split HV drive sub-modes are established in a low-load state of the engine 12 or in a high-speed running state of the vehicle 10 in which the speed reduction ratio I is comparatively low, so that the increases of the torques and speeds of the motor/generator MG1 and the motor/generator MG2 are prevented or reduced, and so that the amount of power required in the drive force circulating state can be reduced in the high-speed running state of the vehicle 10. By selectively establishing the U/D and O/D input split HV drive sub-modes as described above, an energy conversion loss in the electric path can be reduced, and the fuel economy of the vehicle 10 can be improved, or the required sizes or output capacities of the motor/generator MG1 and the motor/generator MG2 can be reduced.

Figure 17:
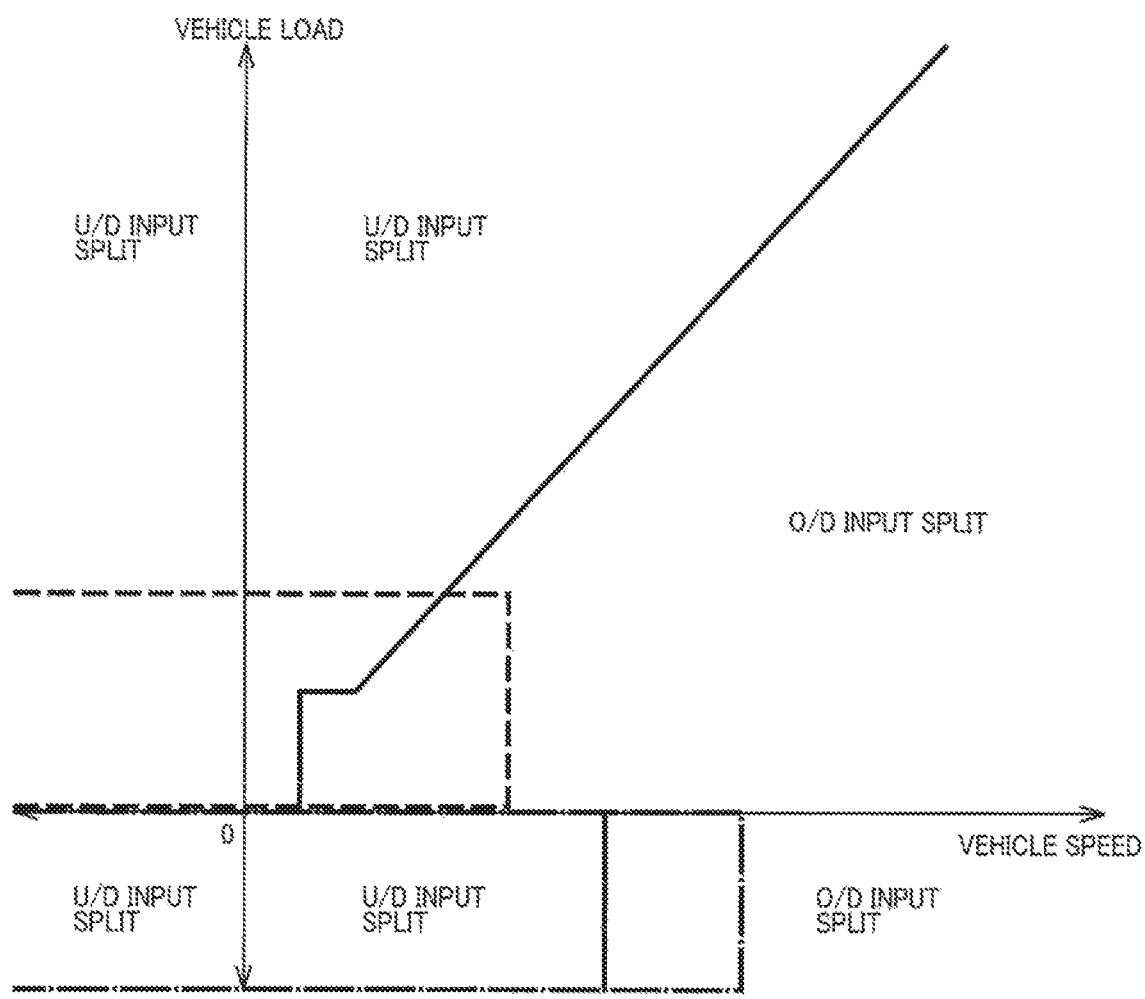
FIG. 17 is a view showing an example of a drive mode switching map formulated according to one embodiment of this invention, to selectively establish sub-modes of an engine drive mode and a motor drive mode such that an amount of electric power stored in a battery is held constant.
Figure 18:
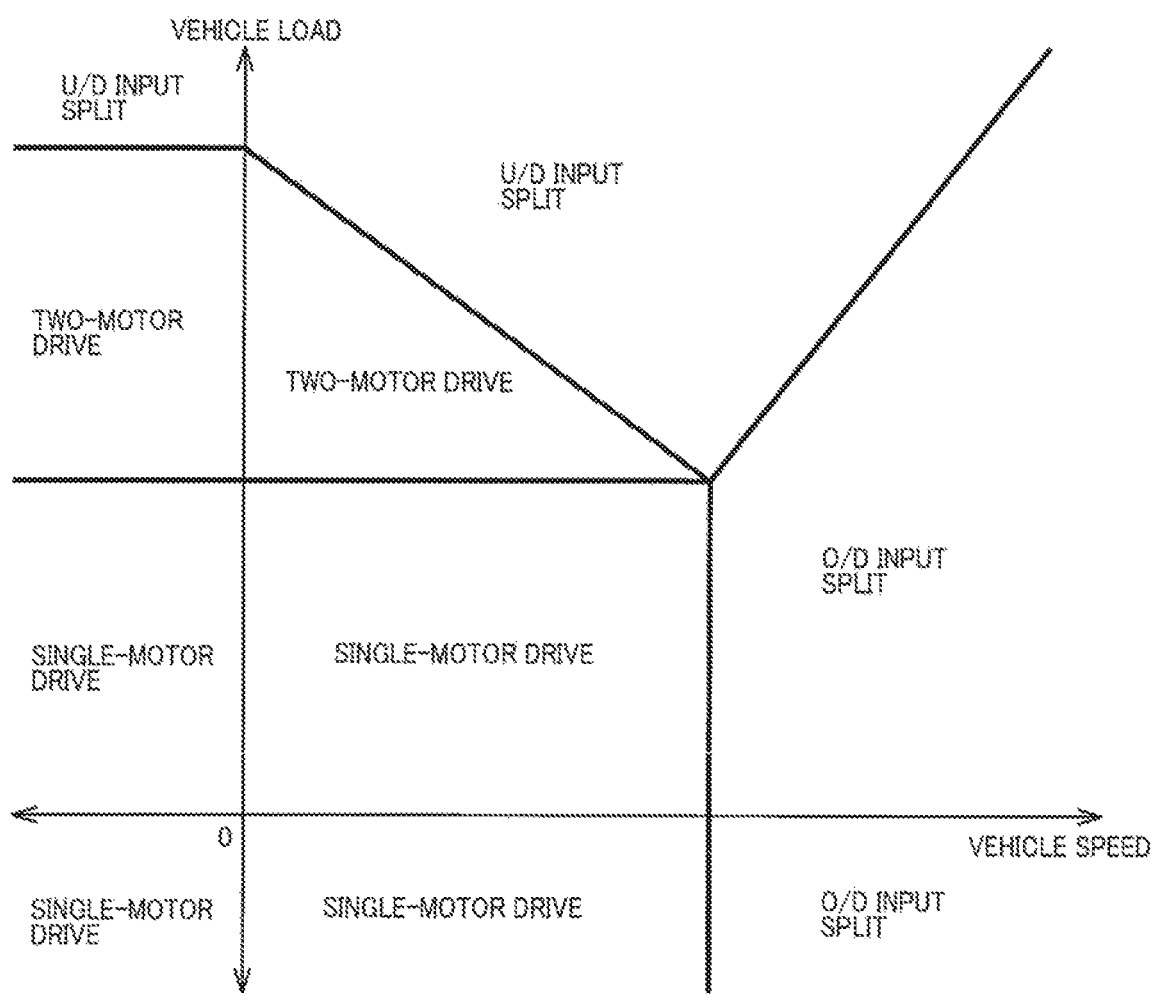
FIG. 18 is a view showing an example of a drive mode switching map formulated to selectively establish sub-modes of the engine drive mode and the motor drive mode such that the electric power stored in the battery is consumed.

FIGS. 17 and 18 are the views showing examples of drive mode switching maps used to selectively establish the sub-modes of the engine drive mode (HV drive mode) and the motor drive mode (EV drive mode). Each of these drive mode switching maps is defined in a two-dimensional coordinate system wherein the vehicle running speed V is taken along a horizontal axis while a running load of the vehicle 10 (hereinafter referred to as "vehicle load" as represented by the required vehicle drive torque) is taken along a vertical axis. Namely, the vehicle speed V and the vehicle load are selected control parameters used to selectively establish the sub-modes of the HV drive mode and the EV drive mode. The drive mode switching maps have switching boundary lines defining the different sub-modes of the HV drive mode and the EV drive mode. The drive mode switching maps are obtained by experimentation or theoretical analysis, and are stored in a memory of the electronic control device 90. Namely, the drive mode switching maps are predetermined relationships among areas of the running state of the vehicle 10 in which the respective different sub-modes of the HV and EV drive modes are selected.

The drive mode switching map of FIG. 17 is formulated to selectively establish the sub-modes while the power transmitting system 14 is placed in a CS state (charge sustainable state) in which the electric power amount SOC stored in the battery unit 52 is held constant. The drive mode switching map of FIG. 17 is used where the vehicle 10 is a hybrid vehicle wherein the maximum electric power amount SOC that can be stored in the battery unit 52 is comparatively small, or while the vehicle 10 is running in a mode to hold the electric power amount SOC constant and where the vehicle 10 is a plug-in hybrid vehicle or a "drive-range-extended" vehicle wherein the maximum electric power amount SOC is comparatively large. On the other hand, the drive mode switching map of FIG. 18 is used while the power transmitting system 14 is placed in a CD state (charge depleting state) in which the electric power amount SOC is consumed. The drive mode switching map of FIG. 18 is used while the vehicle 10 is running in a mode to consume the electric power amount SOC, and where the vehicle 10 is the plug-in hybrid vehicle or "drive-range-extended" vehicle wherein the maximum electric power amount SOC is comparatively large. Where the vehicle 10 is a hybrid vehicle wherein the maximum electric power amount SOC is comparatively small, it is desirable not to use the drive mode switching map of FIG. 18.

In the drive mode switching map of FIG. 17, the switching boundary lines are determined to selectively establish the sub-modes of the HV drive mode according to the running state of the vehicle 10 as represented by its running speed V and load, such that the U/D input split HV drive sub-modes are established in a high-load state of the vehicle 10, or the O/D input split HV drive sub-modes are easily established in a low-load state or a high-speed state of the vehicle 10. When the electric power stored in the battery unit 52 can be consumed (or after a warm-up operation of the engine 12 is finished, or warm-up operations of various devices of the vehicle 10 by the engine 12 are finished), the second motor/generator MG2 is operated to generate a vehicle driving torque in the motor drive mode (EV drive mode) when the vehicle 10 is in a running state in which the engine 12 has a low degree of operating efficiency. Accordingly, single-motor-drive EV drive sub-modes are established in a low-speed low-load state of the vehicle 10, as indicated by broken lines in FIG. 17. Further, when the load of the vehicle 10 is negative, the U/D input split HV drive sub-modes or the O/D input split HV drive sub-modes are established to decelerate the vehicle 10 with an engine brake applied by the engine 12 having a negative torque. When the battery unit 52 can store an electric power, the second motor/generator MG2 is operated as an electric generator in the motor drive mode. The single-motor-drive EV drive sub-modes are established in a negative-load state of the vehicle 10, as indicated by one-dot chain lines in FIG. 17. According to the drive mode switching map of FIG. 17 used in the CS state of the vehicle 10, the U/D input split HV drive sub-modes are established upon starting of the vehicle 10 in both of the forward and reverse directions. Thus, the engine power Pe can be more effectively utilized, so that driving performance of the vehicle 10 in starting can be improved. The speed reduction ratio I of the first power transmitting portion 20 becomes close to "1" as the vehicle running speed V is raised during forward running of the vehicle 10. In this state, the power transmitting system 14 may be switched to the fixed-speed-position direct-engine-force-input sub-mode. In the low-speed state of the vehicle 10 in which the engine speed Ne is extremely low, the power transmitting system 14 is switched from the U/D input split HV drive sub-modes directly to the O/D input split HV drive sub-modes. In the fixed-speed-position direct-engine-force-input sub-mode of the HV drive mode in which the drive force of the engine 12 is not transmitted through the first motor/generator MG1 and the second motor/generator MG2, there is not a heat loss generated due to conversion between mechanical and electric energies, resulting in effective improvement of the fuel economy and prevention of heat generation. In this respect, it is considered desirable to positively establish the fixed-speed-position direct-engine-force-input sub-mode during towing or in any other high-load state or in a high-speed state of the vehicle 10. When the motor drive mode is established by operation of a motor-drive-mode selector switch by the vehicle operator, the single-motor-drive sub-modes of the motor drive mode are established in the running state of the vehicle 10 indicated by the broken lines of FIG. 17.

In the drive mode switching map of FIG. 18, the switching boundary lines are determined to selectively establish the EV drive sub-modes according to the running state of the vehicle 10 as represented by its running speed V and load such that the single-motor-drive EV drive sub-modes are established in a low-load state of the vehicle 10, and the two-motor-drive EV drive sub-mode is established in a high-load state of the vehicle 10. In the two-motor-drive EV drive sub-mode, the power output ratio of the first motor/generator MG1 and the second motor/generator MG2 is determined on the basis of operating efficiencies of the motor/generator MG1 and motor/generator MG2, so as to improve the power consumption economy and lower the temperature of the motor/generator MG1 and motor/generator MG2, and to lower the temperature of the electric power control unit 50. The switching boundary lines may be determined to establish the sub-modes of the HV drive mode in the high-load and high-speed states of the vehicle 10, as indicated in FIG. 18, to use the engine 12 as the vehicle drive power source, according to maximum output of the battery unit 52 and maximum outputs of the motor/generators MG1 and MG2 or in a case where a rise of the rotating speed of any of the rotary elements of the power transmitting system 14 due to an amount of rise of the vehicle running speed V in the EV drive mode is reduced with an operation of the engine 12. Further, the switching boundary lines are determined to establish the single-motor-drive EV drive sub-modes in a negative-load state of the vehicle 10, so that the second motor/generator MG2 performs a regenerative operation. According to the thus formulated drive mode switching map of FIG. 18 used in the CD state, a rise of the vehicle running speed V causes rises of the operating speeds of the motor/generator MG1 and the motor/generator MG2 and the rotating speeds of the rotary elements of the differential mechanisms 38 and 40. To prevent this problem, the drive mode is switched from the EV drive sub-modes to the HV drive sub-modes according to the drive mode switching map of FIG. 17 used in the CS state. It is noted that since the first motor/generator MG1 and the engine 12 are disconnected from each other (power transmission between the first motor/generator MG1 and the engine 12 is interrupted) in the single-motor-drive EV drive sub-modes, the drive mode switching map of FIG. 18 may be modified to establish the single-motor-drive sub-modes of the EV drive mode in a wider range of the vehicle speed V an upper limit of which is higher than that of a range in which the two-motor-drive sub-mode is established. Although the switching map of FIG. 18 is formulated such that the single-motor-drive sub-modes of the EV drive modes are established to perform a regenerative operation in a negative-load state of the vehicle 10, the single-motor-drive sub-modes may be replaced by the two-motor-drive sub-modes. Further, the switching map of FIG. 18 may be formulated to prevent starting of the engine 12 and consumption of the fuel, by limiting the vehicle drive torque or the vehicle speed V within a predetermined upper limit.

The drive mode control portion 94 of the hybrid control portion 92 determines the EV drive or HV drive sub-mode to be established, on the basis of the vehicle running speed V and the vehicle load (required vehicle drive torque, for example), and according to the drive mode switching map of FIG. 17 or FIG. 18. When the determined drive sub-mode to be established is the presently established sub-mode, the drive mode control portion 94 maintains the presently established sub-mode. When the determined drive sub-mode to be established is different from the presently established drive sub-mode, the drive mode control portion 94 establishes the determined drive sub-mode in place of the presently established drive sub-mode.

When the hybrid control portion 92 selects one of the single-motor-drive EV drive sub-modes, the vehicle 10 can be driven with only the second motor/generator MG2 used as the vehicle drive power source. When the hybrid control portion 92 selects the two-motor-drive EV drive sub-mode, the vehicle 10 can be driven with both of the first motor/generator MG1 and the second motor/generator MG2 used as the vehicle drive power source.

When the hybrid control portion 92 selects one of the U/D input split HV drive sub-modes, or one of the O/D input split HV drive sub-modes, the vehicle 10 can be driven with a torque transmitted to the drive wheels 16 from the second motor/generator MG2 operated with an electric power generated by the first motor/generator MG1, while a torque is transmitted from the engine 12 directly to the second carrier C2, with the first motor/generator MG1 operating as an electric generator so as to withstand a reaction torque against the drive force of the engine 12. In the U/D input split HV drive sub-modes and the O/D input split HV drive sub-modes, the hybrid control portion 92 commands the engine 12 to be operated at its operating point (represented by the engine speed Ne and the engine torque Te), which is determined according to a known highest fuel economy line of the engine 12. In this respect, it is noted that the second motor/generator MG2 may be operated with an electric power supplied from the battery unit 52, as well as the electric power generated by the first motor/generator MG1, in the U/D input split HV drive sub-modes and the O/D input split HV drive sub-modes.

When the hybrid control portion 92 selects the fixed-speed-position direct-engine-force-input HV drive sub-mode, the vehicle 10 can be driven with the drive force of the engine 12 directly output to the second carrier C2. In the fixed-speed-position direct-engine-force-input HV drive sub-mode, the hybrid control portion 92 may command the first motor/generator MG1 to be operated with the drive force of the engine 12, as well as the electric power supplied from the battery unit 52, so that a drive force of the first motor/generator MG1 is directly output from the second carrier C2, or command the second motor/generator MG2 to be operated with the electric power supplied from the battery unit 52, so that the drive force of the second motor/generator MG2 is transmitted to the drive wheels 16.

When the vehicle 10 is stopping and the electric power amount SOC stored in the battery unit 52 is smaller than a predetermined lower limit below which the battery unit 52 is required to be charged, the hybrid control portion 92 selects the fixed-speed-position stationary-output-shaft HV drive sub-mode. In the fixed-speed-position stationary-output-shaft HV drive sub-mode, the hybrid control portion 92 commands the first motor/generator MG1 to be operated as an electric generator to generate an electric power for charging the battery unit 52 through the electric power control unit 50, while the first motor/generator MG1 withstands the reaction force against the drive force of the engine 12.

In both of the U/D input split HV drive sub-mode and the O/D input split HV drive sub-mode, the first power transmitting portion 20 functions as an electrically controlled continuously variable transmission. A state of the power transmitting system 14 in which the speed reduction ratio I of the first power transmitting portion 20 is equal to "1" is equivalent to a state in the fixed-speed-position direct-engine-force-input HV drive sub-mode (shown in FIG. 15) in which both of the clutch CL1 and the clutch CLc are placed in the engaged states. Accordingly, the hybrid control portion 92 (more precisely, the drive mode control portion 94) switches the power transmitting system 14 between the U/D input split HV drive sub-modes (established in the engaged state of the clutch CL1) and the O/D input split HV drive sub-modes (established in the engaged state of the clutch CLc), by switching the operating states of the clutches CL1 and CLc in a synchronizing state of the first power transmitting portion 20 in which the speed reduction ratio I is equal to "1". The power transmitting system 14 is switched between the U/D and O/D input split HV drive sub-modes, through the fixed-speed-position direct-engine-force-input HV drive sub-mode, or through a state almost equivalent to the fixed-speed-position direct-engine-force-input HV drive sub-mode. Alternatively, the drive mode control portion 94 may switch the power transmitting system 14 between the U/D and O/D input split HV drive sub-modes, by implementing concurrent engaging and releasing actions of one and the other of the respective clutches CL1 and CLc.

In the single-motor-drive EV drive sub-modes, the clutch CL1 or the clutch CLc is placed in the engaged state, so that the engine 12 is forcibly driven with the reverse drive force transmitted from the drive wheels 16. When the hybrid control portion 92 commands the engine 12 to be started in the single-motor-drive sub-modes of the EV drive mode, the drive mode control portion 94 commands the clutch CL1 or the clutch CLc to be brought into its engaged state, for raising the engine speed Ne for ignition of the engine 12. In this case, the hybrid control portion 92 may command the first motor/generator MG1 to be operated to raise the engine speed Ne.

Alternatively, the hybrid control portion 92 commands the engine 12 to be started in the single-motor-drive EV drive sub-modes, by controlling the first motor/generator MG1 to implement a synchronous control of the rotating speeds of the rotary elements of the first and second differential mechanisms 38 and 40, such that the differential mechanisms 38 and 40 are placed in a state identical with a state in which the clutch CL1 or the clutch CLc is placed in the engaged state while the engine speed Ne is zero [rpm]. The drive mode control portion 94 commands the clutch CL1 to be brought into the engaged state when the state of the differential mechanisms 38, 40 becomes identical with the state in which the clutch CL1 is placed in the engaged state, or commands the clutch CLc to be brought into the engaged state when the state of the differential mechanisms 38, 40 becomes identical with the state in which the clutch CLc is placed in the engaged state, so that the engine speed Ne is raised by the first motor/generator MG1, for ignition of the engine 12. Namely, when the engine 12 is started in the single-motor-drive EV drive sub-modes, the hybrid control portion 92 implements the synchronous control of the rotating speeds of the rotary elements of the differential mechanisms 38, 40 with the first motor/generator MG1, such that the rotating speeds are the same as in the standby sub-modes, although the standby sub-modes are not yet established, that is, before the clutch CL1 or CLc to establish the corresponding standby sub-mode is brought into the engaged state. After the synchronous control is implemented, the relevant clutch CL1 or CLc is brought into the engaged state to temporarily establish the standby sub-mode. In the thus established standby sub-mode, the first motor/generator MG1 is operated to raise the engine speed Ne for thereby igniting the engine 12. As described above, the engine 12 may be started in the single-motor-drive EV drive sub-modes, by switching the drive mode from the single-motor-drive EV drive sub-modes to the engine drive mode (HV drive mode) through the standby sub-modes of the EV drive mode. In this case, the vehicular power transmitting system 14 is switched to the U/D input split HV drive sub-mode through the corresponding U/D input split EV drive sub-mode, or to the O/D input split HV drive sub-mode through the corresponding O/D input split EV drive sub-mode.

Upon starting of the engine 12, a negative torque of the engine 12 is transmitted to the second carrier C2 connected to the drive wheels 16, as a reaction force to raise the speed Ne of the engine 12 held at rest, so that the vehicle drive torque is reduced. When the engine 12 is started in the single-motor-drive EV drive sub-modes, the hybrid control portion 92 commands the second motor/generator MG2 to generate an assisting drive torque (reaction force canceling torque) for compensation for an amount of reduction of the vehicle drive torque, to reduce a risk of generation of an engine starting shock.

In the two-motor-drive EV drive sub-mode in which the clutch CL1 and the brake BR1 are placed in the engaged states, the engine 12 is forcibly driven if the brake BR1 is brought into the released state. To start the engine 12 in the two-motor-drive EV drive sub-mode, therefore, the drive mode control portion 94 commands the brake BR1 to be brought into the released state and then commands the clutch CLc to be brought into the engaged state, to raise the engine speed Ne for ignition of the engine 12. In this case, the hybrid control portion 92 may command the first motor/generator MG1 to be operated to raise the engine speed Ne. Alternatively, the drive mode control portion 94 may command the brake BR1 to be brought into the released state, to raise the engine speed Ne for ignition of the engine 12, for starting the engine 12 in the two-motor-drive EV drive sub-mode. Further alternatively, the engine 12 can be started in the single-motor-drive EV drive sub-mode, by bringing the clutch CL1 and the brake BR1 into the released states, since the differential mechanisms 38 and 40 in the two-motor-drive EV drive sub-mode are placed in the same state as in the single-motor-drive EV drive sub-mode, by placing the clutch CL1 and the brake BR1 in the released states. The hybrid control portion 92 commands the second motor/generator MG2 to generate the reaction force canceling force as the assisting drive torque, for starting the engine 12 in the two-motor-drive EV drive sub-mode.

There will be described running of the vehicle 10 with a braking torque of the engine 12 being applied to the vehicle 10. The hybrid control portion 92 determines a target value of deceleration of the vehicle 10, on the basis of the operation of the accelerator pedal by the vehicle operator (such as the accelerator pedal operation amount θacc and a rate of reduction of the operation amount θacc), the vehicle running speed V, a gradient of a downhill roadway on which the vehicle 10 is running, and an operation of a brake pedal by the vehicle operator to operate vehicle wheel brakes (such as an amount and a speed of operation of the brake pedal). The hybrid control portion 92 controls the vehicle braking torque so as to establish the determined target deceleration value of the vehicle 10. The braking torque of the vehicle 10 is a sum of a regenerative braking torque generated by the second motor/generator MG2, a wheel braking torque, and the engine braking torque, for example. For improvement of the fuel economy of the vehicle 10, the generation of the regenerative braking torque by the second motor/generator MG2 is given higher priority, to generate the required braking torque of the vehicle 10. The amount of generation of the regenerative braking torque by the second motor/generator MG2 is limited when the electric power amount SOC stored in the battery unit 52 is relatively large, and/or when the determined target vehicle deceleration value is relatively high, or the braking operation is not by the driver, the wheel braking torque and/or the engine braking torque are/is generated in place of or in addition to the regenerative braking torque. Where a portion or an entirety of the required braking torque of the vehicle 10 is generated by the engine braking torque, the drive mode control portion 94 establishes the first or second engine-braking drive mode, so that the engine braking torque is generated during running of the vehicle 10.

The drive mode control portion 94 selectively establishes one of the U/D input split engine-braking EV drive sub-mode (first engine-braking drive mode) and the O/D input split engine-braking EV drive sub-mode (second engine-braking drive mode), according to the drive mode switching map of FIG. 17, for example. The drive mode control portion 94 establishes the U/D input split engine-braking EV drive sub-mode where the running state of the vehicle 10 represented by the vehicle running speed V and the vehicle load is in an area, of the U/D input split EV drive sub-modes defined in the drive mode switching map of FIG. 17, for example, in which the vehicle load is a negative value. On the other hand, the drive mode control portion 94 establishes the O/D input split engine-braking EV drive sub-mode where the running state of the vehicle 10 is in an area of the O/D input split EV drive sub-modes in which the vehicle load is a negative value.

By the way, the engine-braking drive mode may be switched between the first engine-braking drive mode (U/D input split EV drive sub-mode) and the second engine-braking drive mode (O/D input split EV drive sub-mode), when the running state of the vehicle 10 is changed during running of the vehicle 10 in the engine-braking drive mode, for example, when the vehicle running speed V is raised or lowered. This switching of the engine-braking drive mode may cause a change of the engine speed Ne and a change of the braking torque of the engine 12. Since the change of the engine braking torque has a risk of generation of shifting shock of the power transmitting system 14, it is desirable to minimize the amount of change of the engine braking torque. In this respect, it is noted that the engine braking principally lowers the vehicle running speed V, but may cause a rise of the vehicle running speed V during running of the vehicle 10 on a downhill road. Therefore, the engine-braking drive mode may be switched not only from the U/D input split engine-braking EV drive sub-mode to the O/D input split engine-braking EV drive sub-mode, as a result of a rise of the vehicle running speed V, but also from the O/D input split engine-braking EV drive sub-mode to the U/D input split engine-braking EV drive sub-mode as a result of a drop of the vehicle running speed V, as is apparent from the drive mode switching map of FIG. 17.

In view of the above, the drive mode control portion 94 is configured to switch the engine-braking drive mode between the U/D input split engine-braking EV drive sub-mode and the O/D input split engine-braking EV drive sub-mode, such that the engine speed Ne is held constant in the process of switching between the U/D and O/D input split engine-braking EV drive sub-modes during running of the vehicle 10 in the engine-braking drive mode.

During running of the vehicle 10 in one of the U/D and O/D input split engine-braking EV drive sub-modes, the drive mode control portion 94 determines, according to the drive mode switching map of FIG. 17, whether the engine-braking drive mode should be switched to the other of those two engine-braking EV drive sub-modes. Namely, the drive mode control portion 94 determines whether the engine-braking drive mode should be switched between the U/D and O/D input split engine-braking EV drive sub-modes. If an affirmative determination is made, the drive mode control portion 94 switches the engine-braking drive mode between the U/D and O/D input split engine-braking EV drive sub-modes.

The drive mode control portion 94 switches the power transmitting system 14 between the U/D and O/D input split engine-braking EV drive sub-modes, by switching the operating states of the clutches CL1 and CLc in the synchronizing state of the first power transmitting portion 20 in which the speed reduction ratio I is equal to "1", as in the case where the drive mode control portion 94 switches the power transmitting system 14 between the U/D and O/D input split HV drive sub-modes. The power transmitting system 14 is switched between the U/D and O/D input split engine-braking EV drive sub-modes, through the fixed-speed-position direct-engine-force-input EV drive sub-mode (indicated in FIG. 15), or a sub-mode equivalent to the fixed-speed-position direct-engine-force-input EV drive sub-mode. Thus, the drive mode control portion 94 switches the engine-braking drive mode between the U/D and O/D input split engine-braking EV drive sub-modes, by switching the operating states of the clutches CL1 and CLc while all of the rotary elements of the first and second differential mechanisms 38 and 48 are rotated as a unit. This engine-braking drive mode switching control may be called a "synchronous switching control".

Alternatively, the drive mode control portion 94 may switch the power transmitting system 14 between the U/D and O/D input split engine-braking EV drive sub-modes, by implementing the concurrent engaging and releasing actions of one and the other of the respective clutches CL1 and CLc, as in the case where the drive mode control portion 94 switches the power transmitting system 14 between the U/D and O/D input split HV drive sub-modes. At this time, the drive mode control portion 94 controls the operating state of the first motor/generator MG1 such that the engine speed Ne is held constant. Thus, the drive mode control portion 94 switches the engine-braking drive mode between the U/D and O/D input split engine-braking EV drive sub-modes, by controlling the clutches CL1 and CLc such that one of these clutches CL1 and CLc which has been placed in the released state prior to the switching between those two engine-braking EV drive sub-modes is brought into the engaged state while the other of the clutches CL1 and CLc which has been placed in the engaged state is brought into the released state prior to the switching between the two engine-braking EV drive sub-modes, and by controlling the first motor/generator MG1 such that the engine speed Ne is held constant in the process of the switching between the two engine-braking EV drive sub-modes. This engine-braking drive mode switching control may be called a "non-synchronous switching control".

In the non-synchronous switching control involving the concurrent engaging and releasing actions of one and the other of the clutches CL1 and CLc, there is a possibility of variation of the engine speed Ne in the process of the engaging action of the clutch CL1 or CLc which has been placed in the released state prior to the switching of the engine-braking drive mode (namely, in the process of a change of the rotating speed of the third rotary element RE3 in the form of the first sun gear S1). In view of this possibility, the drive mode control portion 94 controls the first motor/generator MG1 during the change of the rotating speed of the first sun gear S1, such that the engine speed Ne is held constant.

As indicated above, the drive mode control portion 94 switches the engine-braking drive mode by implementing the synchronous switching control or the non-synchronous switching control. In other words, the drive mode control portion 94 is required to have a function to implement at least one of the synchronous switching control and the non-synchronous switching control. It is noted, however, that the synchronous switching control cannot be implemented unless an operating state of the first power transmitting portion 20 is changing toward its synchronizing state in which the speed reduction ratio I is equal to "1", with a change of the vehicle running speed V, and/or a change of the required engine braking torque. Where the drive mode control portion 94 has the function of implementing only the synchronous switching control, the drive mode control portion 94 cannot switch the engine-braking drive mode, and therefore maintains the presently established engine-braking drive mode, when the operating state of the first power transmitting portion 20 is not changing toward the synchronizing state.

Where the drive mode control portion 94 has the function of implementing both of the synchronous and non-synchronous switching controls, the drive mode control portion 94 can selectively implement one of the synchronous and non-synchronous switching controls. In this case, the drive mode control portion 94 is preferably configured to implement the synchronous switching control with higher priority than the non-synchronous switching control, in the synchronizing state of the first power transmitting portion 20 (in which the speed reduction ratio I is equal to "1"), such that the operating states of the clutches CL1 and CLc are merely controlled without a need of controlling the first motor/generator MG1 to control the operating speed Ne of the engine 12. That is, the drive mode control portion 94 implements the synchronous control rather than the non-synchronous control, when the synchronous control can be executed.

Described more specifically, the running state determining portion 96 of the electronic control device 90 is provided to reduce a risk of generation of a shifting shock of the power transmitting system 14 due to switching of the engine-braking drive mode.

The running state determining portion 96 is configured to determine whether the vehicle 10 is placed in a running state in which the drive mode control portion 94 can implement the synchronous switching control. Whether the required braking torque of the engine 12 can be obtained or not in the engine-braking drive mode depends upon the engine speed Ne. Therefore, it is possible to determine that the synchronous switching control can be implemented, if the first power transmitting portion 20 can be brought into its synchronizing state in which the speed reduction ratio I is equal to "1", as long as the present manner of change (present reduction, for example) of the vehicle running speed V is continued. Namely, it is possible to determine that the synchronous switching control can be implemented, if the present direction of change of the vehicle running speed V permits the operating state of the first power transmitting portion 20 to change toward its synchronizing state in which the speed reduction ratio I is equal to "1". When the drive mode control portion 94 has determined that the engine-braking drive mode should be switched between the U/D and O/D input split engine-braking HV drive sub-modes, the running state determining portion 96 determines whether the running state of the vehicle 10 is changing, with a change of its running speed V, toward the state in which all of the rotary elements of the first and second differential mechanisms 38 and 40 are rotated as a unit, to thereby determine whether the drive mode control portion 94 can implement the synchronous switching control. It is noted that the engine speed Ne at which the required braking torque of the engine 12 can be obtained changes with a change of the required engine braking torque. In view of this, the running state determining portion 96 may be configured to determine whether the synchronous switching control can be implemented, on the basis of the change of the engine speed Ne with the change of the required engine braking torque.

The running state determining portion 96 determines whether the operating state of the first power transmitting portion 20 has been brought into its synchronizing state in which the speed reduction ratio I is equal to "1", that is, in which all of the rotary elements of the first and second differential mechanisms 38 and 40 are rotated as a unit.

Where the running state determining portion 96 has determined that the vehicle 10 is in the running state in which the drive mode control portion 94 can implement the synchronous switching control, the drive mode control portion 94 does not implement the synchronous switching control until the first and second differential mechanisms 38 and 40 have been brought into the state in which all of their rotary elements are rotated as a unit, namely, until the first power transmitting portion 20 has been brought into its synchronizing state in which the speed reduction ratio I is equal to "1". When the running state determining portion 96 has determined that the first power transmitting portion 20 has been brought into its synchronizing state, the drive mode control portion 96 initiates the synchronous switching control. Where the running state determining portion 96 has determined that the vehicle 10 is not in the running state in which the synchronous switching control can be implemented, the drive mode control portion 94 implements the non-synchronous switching control.

Figure 19:
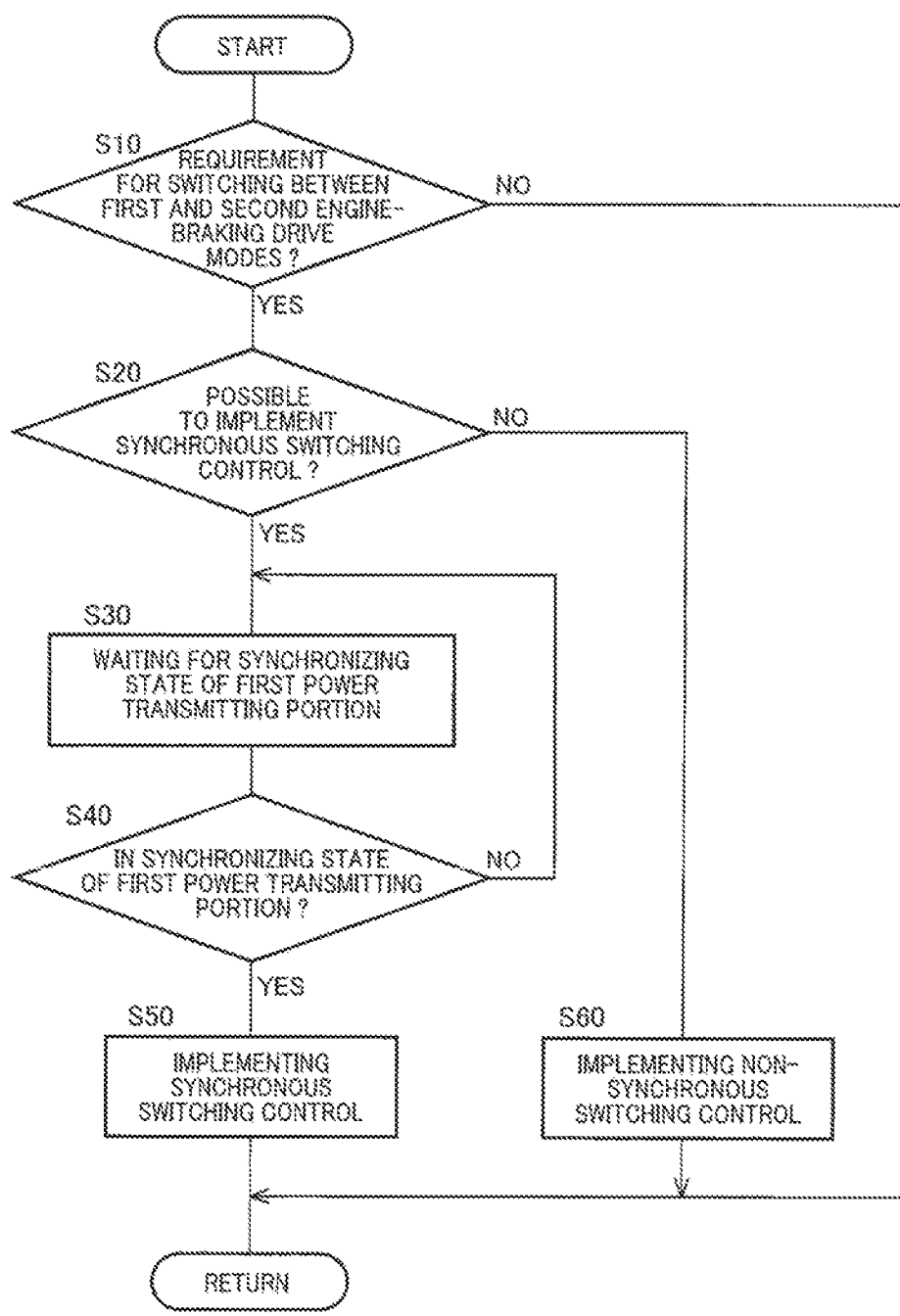
FIG. 19 is a flow chart illustrating major portions of a control operation performed by an electronic control device, namely, a control operation for switching the power transmitting system from one of two engine-braking sub-modes to the other, so as to reduce a shifting shock of the power transmitting system.
Figure 20:
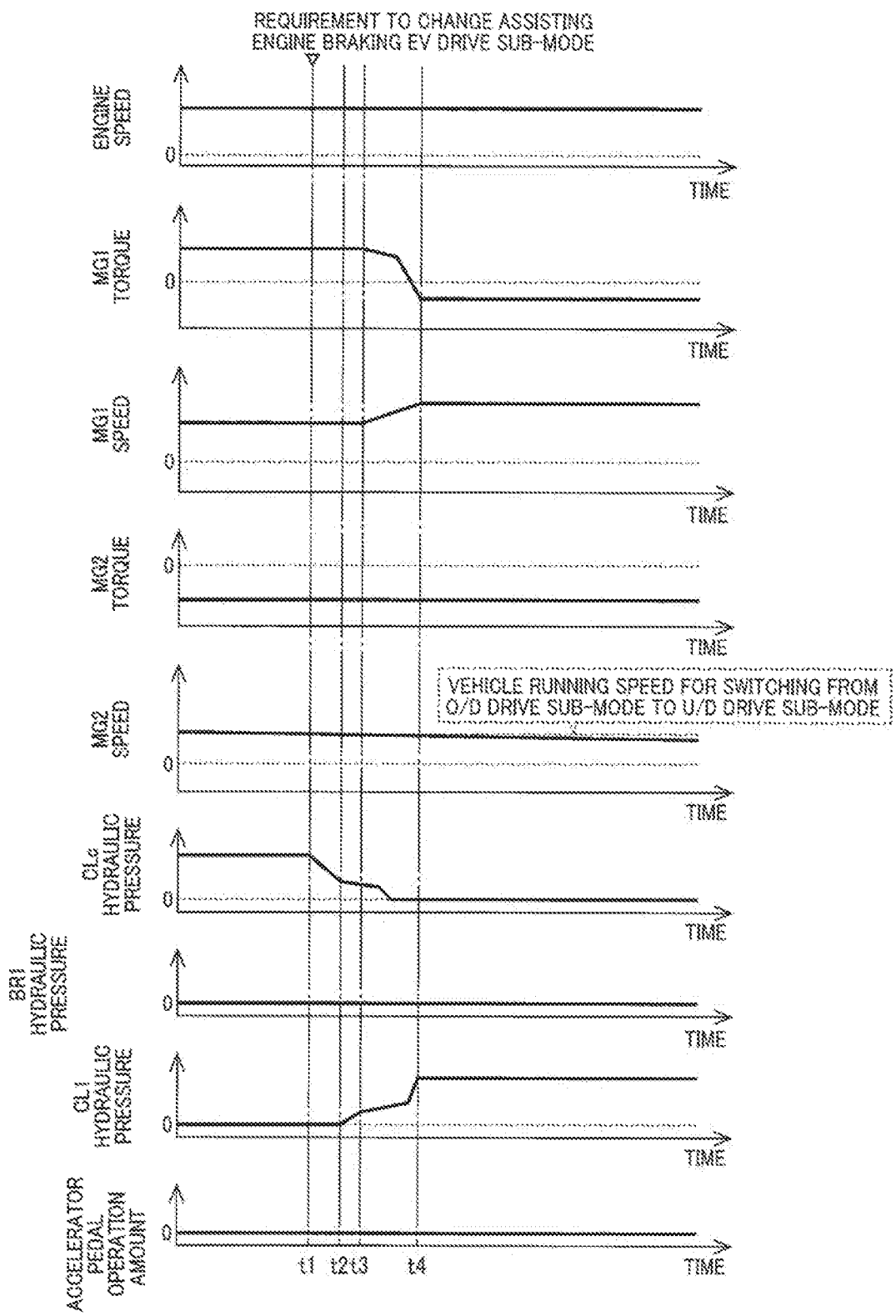
FIG. 20 is a time chart indicating an example of change of various parameters when the control operation of FIG. 19 is performed.

FIG. 19 is the flow chart illustrating major portions of a control operation performed by the electronic control device 90, namely, a control operation for reducing switching shock of the power transmitting system 14 due to switching the power transmitting system 14 from one of the UM and O/D input split engine-braking EV drive sub-modes (one of the first and second engine-braking drive modes) to the other. The control operation is repeatedly performed. FIG. 20 the time chart indicating changes of various parameters when the control operation of FIG. 19 is performed.

The control operation of FIG. 19 is initiated with a step S10 corresponding to the function of the drive mode control portion 94, to determine whether the engine-braking drive mode should be switched between the first and second engine-braking drive modes. If a negative determination is obtained in the step S10, one cycle of execution of the control routine of FIG. 19 is terminated. If an affirmative determination is obtained in the step S10, the control flow goes to a step S20 corresponding to the function of the running state determining portion 96, to determine whether the synchronous switching control can be implemented. If an affirmative determination is obtained in the step S20, the control flow goes to a step S30 also corresponding to the function of the drive mode control portion 94, to wait the implementation of the synchronous switching control for establishment of the synchronizing state of the first power transmitting portion 20 in which the speed reduction ratio I is equal to "1". Then, the control flow goes to a step S40 also corresponding to the function of the running state determining portion 96, to determine whether the first power transmitting portion 20 has been brought into its synchronizing state in which the speed reduction ratio I is equal to "1". If a negative determination is obtained in the step S40, the control flow goes back to the step S30. If an affirmative determination is obtained in the step S40, the control flow goes to a step S50 also corresponding to the function of the drive mode control portion 94, to implement the synchronous switching control. Thus, the engine-braking drive mode is switched between the first and second engine-braking drive modes in the synchronizing state of the first power transmitting portion 20 in which the speed reduction ratio I is equal to "1", so that the engine speed Ne is held constant, that is, does not change before and after the switching of the engine-braking drive mode, and the braking torque of the engine 12 is also held constant. However, a slight amount of change of the engine braking torque is allowable, as long as the change does not cause significant deterioration of drivability of the vehicle 10. That is, the engine speed Ne may more or less change during the synchronous switching control implemented in a state almost equivalent to the synchronizing state. If a negative determination is obtained in the step S20, the control flow goes to a step S60 also corresponding to the function of the drive mode control portion 94, to implement the non-synchronous switching control in which the first motor/generator MG1 is controlled so as to hold the engine speed Ne constant as much as possible, namely, so as to minimize the amount of change of the engine speed Ne.

Referring to the time chart of FIG. 20 indicating the example of change of the various parameters when the engine-braking drive mode is switched from the O/D input split engine-braking EV drive sub-mode to the U/D input split engine-braking EV drive sub-mode, according to the non-synchronous switching control. In FIG. 20, "t1" represents a point of time at which the switching of the engine-braking drive mode from the O/D input split engine-braking EV drive sub-mode to the U/D input split engine-braking EV drive sub-mode is required. In the example of FIG. 20, the non-synchronous switching control is implemented (during a time period from the point of time t1 to a point of time t4) in response to the requirement of switching of the engine-braking drive mode. Described more specifically, the clutch-to-clutch shifting control is executed in which the CLc hydraulic pressure Pclc is lowered to bring the clutch CLc into its released state, while at the same time the CL1 hydraulic pressure Pcl1 is raised to bring the clutch CL1 into its engaged state, so that the engine-braking drive mode is switched from the O/D input split engine-braking EV drive sub-mode to the U/D input split engine-braking EV drive sub-mode. During this switching of the engine-braking drive mode, the MG1 speed Ng is controlled to hold the engine speed Ne constant as much as possible.

As described above, the electronic control device 90 according to the present embodiment is configured to switch the power transmitting system 14 in the engine-braking drive mode between the U/D input split engine-braking EV drive sub-mode (first engine-braking drive mode) and the O/D input split engine-braking EV drive sub-mode (second engine-braking drive mode), such that the operating speed Ne of the engine 12 is held constant in the process of switching between the two engine-braking EV drive sub-modes, so that the amount of change of the engine speed Ne is reduced, and the amount of variation of the engine braking torque is accordingly reduced. Accordingly, the electronic control device 90 permits reduction of the risk of generation of the shifting shock of the power transmitting system 14 upon its switching between the two engine-braking drive modes.

The present electronic control device 90 is further configured to switch the power transmitting system 14 between the first and second engine-braking drive modes, by switching the operating states of the two clutches CL1 and CLc in the state of the first and second differential mechanisms 38 and 40 in which all of their rotary elements are rotated as a unit, namely, by implementing the synchronous switching control. Accordingly, the power transmitting system 14 is switched between the first and second engine-braking drive modes, so as to reduce the amount of change of the rotating speeds of the rotary elements of the first and second differential mechanisms 38 and 40, and so as to hold the engine speed Ne constant, in the process of switching of the power transmitting system 14 between the first and second engine-braking drive modes.

The present electronic control device 90 is also configured to switch the power transmitting system 14 between the first and second engine-braking drive modes, by implementing the concurrent engaging and releasing actions of one and the other of the two clutches CL1 and CLc, and to implement the non-synchronous switching control in which the first motor/generator MG1 is controlled such that the operating speed Ne of the engine 12 is held constant in the process of switching of the power transmitting system 14 between the first and second engine-braking drive modes. Thus, the engine-braking drive modes are switched while the engine operating speed Ne is kept constant.

The present electronic control device 90 is further configured to control the first motor/generator MG1 in the process of a change of the rotating speed of the first sun gear S1 (third rotary element RE3), such that the operating speed Ne of the engine 12 is held constant. Accordingly, an amount of change of the engine speed Ne can be adequately reduced.

The present electronic control device 90 is also configured to selectively implement one of the synchronous switching control and the non-synchronous switching control, for switching the power transmitting system 14 between the first and second engine-braking drive modes, such that the engine speed Ne is held constant in the process of switching of the power transmitting system 14 between the first and second engine-braking drive modes. Where the vehicle 10 is placed in the running state in which the synchronous switching control can be implemented, this synchronous switching control is implemented with higher priority than the non-synchronous switching control. Accordingly, there is a high degree of opportunity of switching the power transmitting system 14 between the first and second engine-braking drive modes such that the engine speed Ne can be held constant by merely switching the operating states of the two clutches CL1 and CLc, without a need of controlling the first motor/generator MG1 to control the engine speed Ne.

The present electronic control device 90 is further configured to determine whether the vehicle 10 is placed in the running state in which the synchronous switching control can be implemented, by determining whether the operating states of the first and second differential mechanisms 38 and 40 are changing, with a change of the running speed V of the vehicle 10, toward the state in which all of their rotary elements are rotated as a unit. Thus, the synchronous switching control and the non-synchronous switching control are selectively implemented, such that the synchronous switching control is implemented with higher priority than the non-synchronous switching control.

The present electronic control device 90 is also configured such that where it is determined that the vehicle 10 is in the running state in which the synchronous switching control can be implemented, the synchronous switching control is not implemented until the first and second differential mechanisms 38 and 40 have been brought into the state in which all of their rotary elements are rotated as a unit. Accordingly, the operating states of the two clutches CL1 and CLc can be adequately switched in the vehicle running state in which all of the rotary elements of the first and second differential mechanisms 38 and 40 are rotated as a unit.

The present electronic control device 90 is further configured such that the determination as to whether the power transmitting system 14 should be switched between the first and second engine-braking drive modes is made according to the drive mode switching map indicated in FIG. 17 by way of example, and such that the power transmitting system 14 is switched between the first and second engine-braking drive modes when it is determined that the power transmitting system 14 should be switched between the first and second engine-braking drive modes. Accordingly, the engine braking is applied to the vehicle 10 in one of the first and second engine-braking drive modes which is selected according to the running state of the vehicle 10. In addition, the amount of variation of the braking torque of the engine 12 upon switching of the power transmitting system 14 between the first and second engine-braking drive modes is effectively reduced.

While the preferred embodiment of the invention has been described by reference to the drawings, the present invention may be otherwise embodied.

Figure 21:
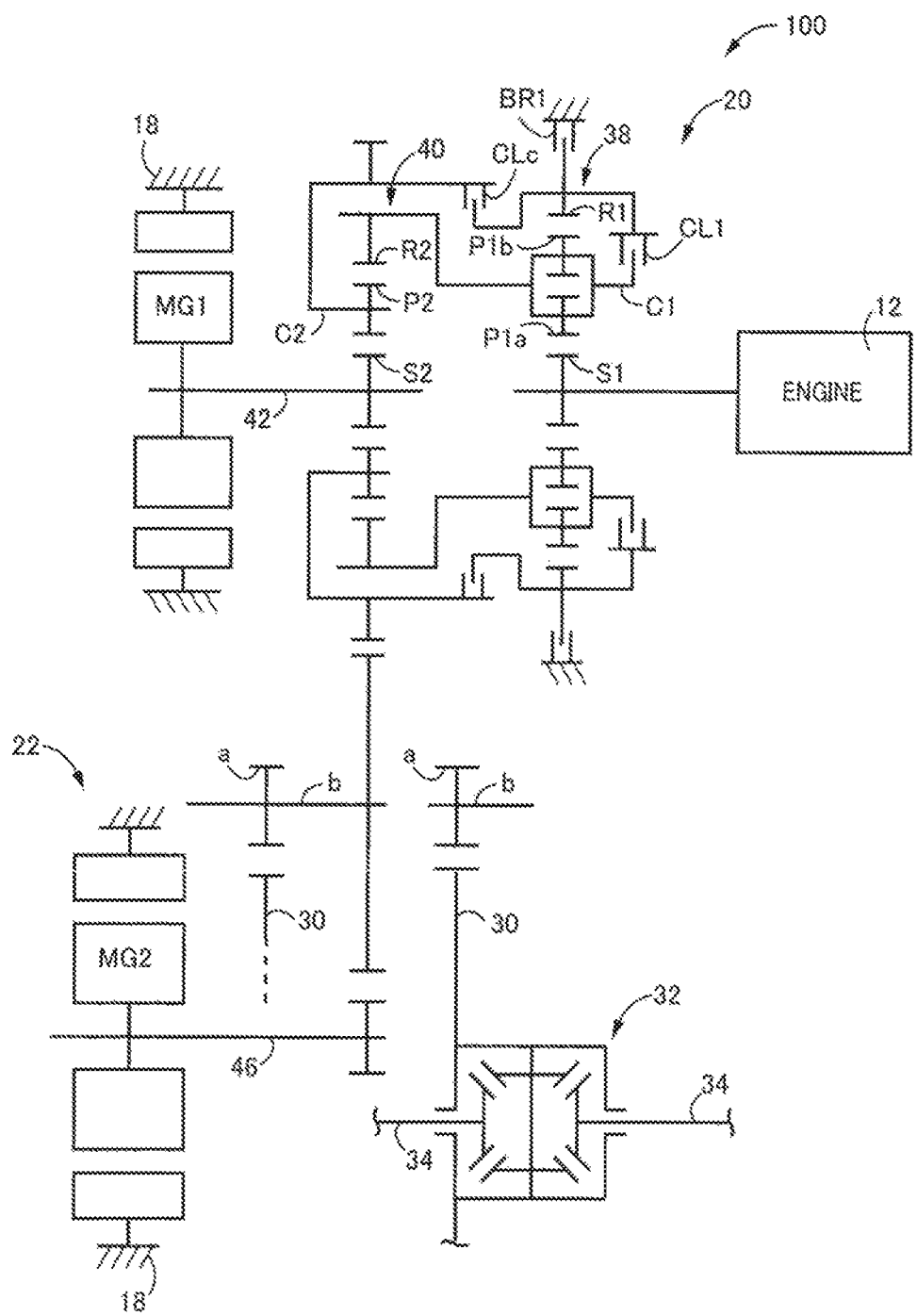
FIG. 21 is a schematic view showing an arrangement of a vehicular power transmitting system according to another embodiment of the invention, which is different from that of FIG. 1.
Figure 22:
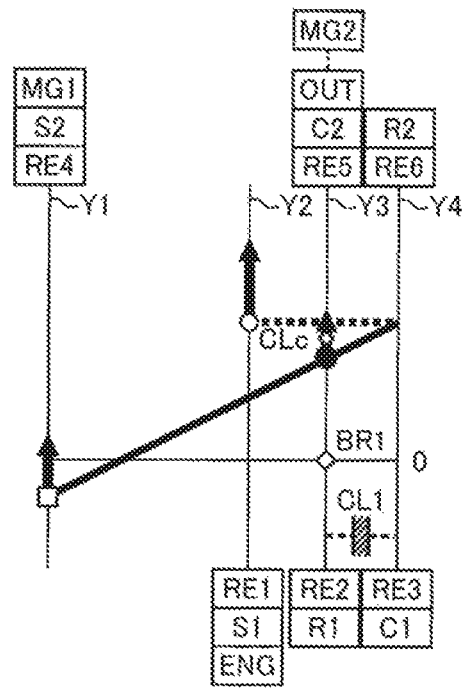
FIG. 22 is a collinear chart indicating the relative rotating speeds of the rotary elements when the power transmitting system of FIG. 21 is placed in its U/D input split HV forward drive sub-mode.
Figure 23:
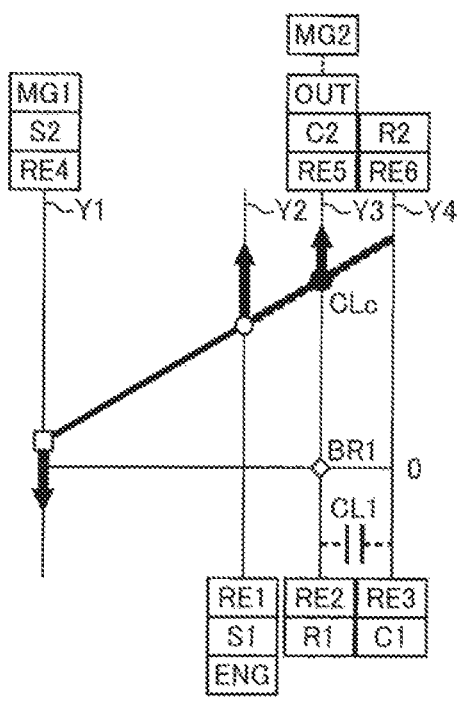
FIG. 23 is a collinear chart indicating the relative rotating speeds of the rotary elements when the power transmitting system of FIG. 21 is placed in its O/D input split HV forward drive sub-mode.

In the illustrated embodiment, the clutch CL1 is provided as the first coupling device for selectively connecting the first rotary element RE1 and the second rotary element RE2 to each other. However, the first coupling device is not limited to this clutch CL1. For instance, the clutch CL1 may selectively connect the second rotary element RE2 and the third rotary element RE3 to each other, as in a vehicle 100 of FIG. 21, and as indicated in the collinear charts of FIGS. 22 and 23. Alternatively, the clutch CL1 may selectively connect the first rotary element RE1 and the third rotary element RE3 to each other, as in a vehicle 400 of FIG. 33. Namely, the first coupling device provided according to the present invention is required to connect two elements of the first, second and third rotary elements RE1, RE2 and RE3 to each other. FIG. 22 is the collinear chart indicating the relative rotating speeds of the rotary elements when the power transmitting system of the vehicle 100 is placed in its U/D input split HV forward drive sub-mode, while FIG. 23 is the collinear chart indicating the relative rotating speeds of the rotary elements when the power transmitting system 14 of the vehicle 100 is placed in the O/D input split HV forward drive sub-mode.

Figure 24:
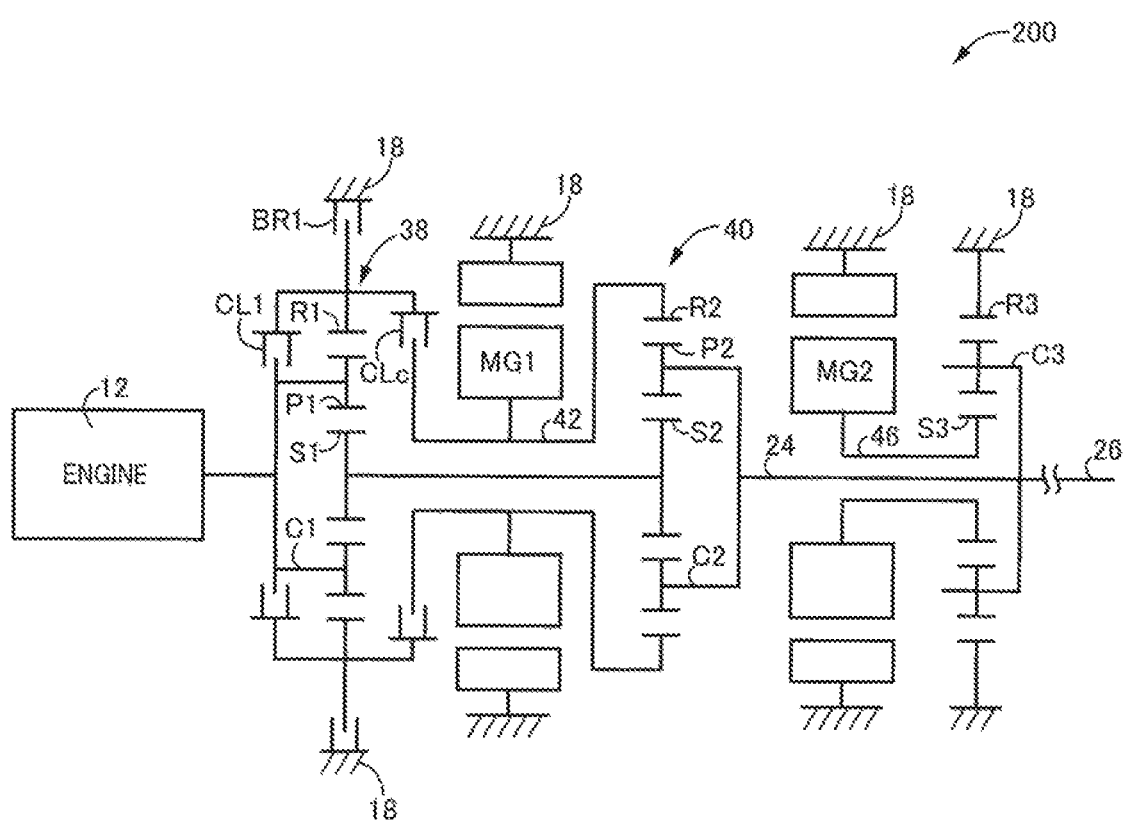
FIG. 24 is a schematic view showing an arrangement of a vehicular power transmitting system according to a further embodiment of the invention, which is different from that of FIG. 1.
Figure 25:
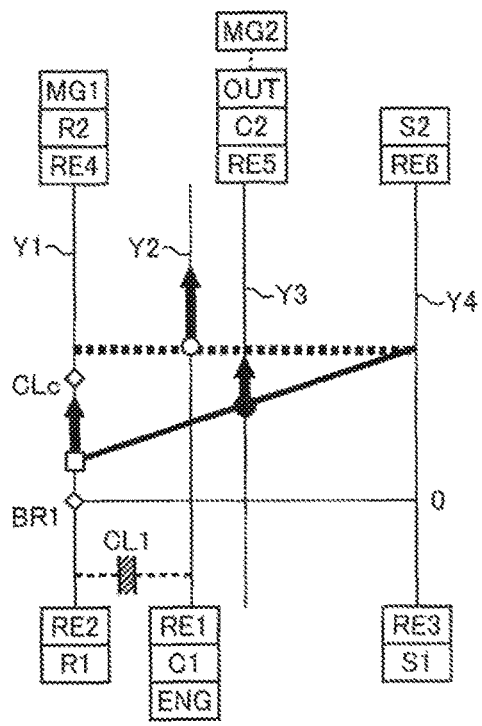
FIG. 25 is a collinear chart indicating the relative rotating speeds of the rotary elements when the vehicular power transmitting system of FIG. 24 is placed in its U/D input split HV forward low-speed drive sub-mode.
Figure 26:
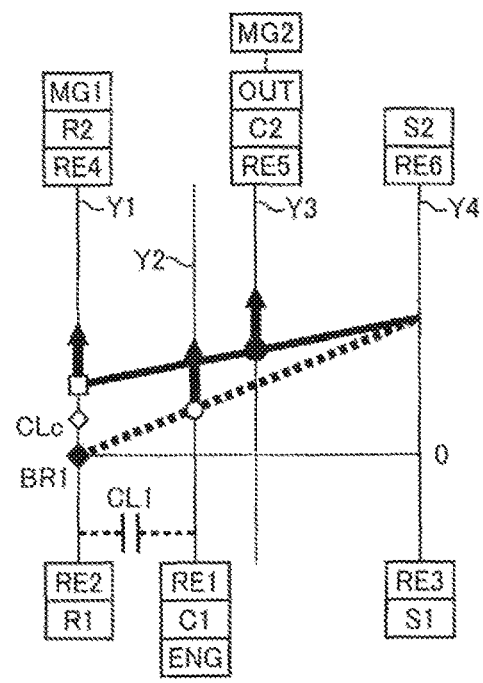
FIG. 26 is a collinear chart indicating the relative rotating speeds of the rotary elements when the vehicular power transmitting system of FIG. 24 is placed in its U/D input split HV forward high-speed drive sub-mode.
Figure 27:
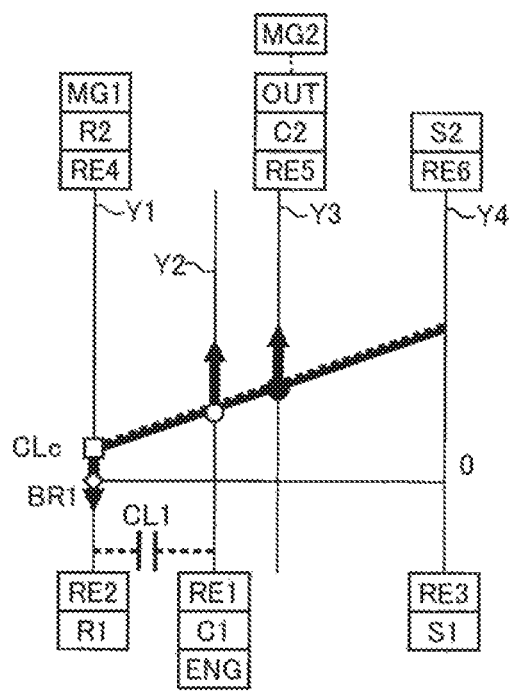
FIG. 27 is a collinear chart indicating the relative rotating speeds of the rotary elements when the vehicular power transmitting system of FIG. 24 is placed in its O/D input split HV forward drive sub-mode.

In the illustrated embodiment, the relative rotating speeds of the first through sixth rotary elements RE1-RE6 of the first and second differential mechanisms 38 and 40 are indicated in the collinear charts of FIGS. 4-16, such that the vertical line Y1 represents the rotating speed of the fourth rotary element RE4 connected to the first motor/generator MG1, the vertical line Y2 represents the rotating speed of the first rotary element RE1 connected to the engine 12, the vertical line Y3 represents the rotating speed of the second rotary element RE2 selectively connected to the casing 18 through the brake BR1, and the rotating speed of the fifth rotary element RE5 connected to the output shaft 24, and the vertical line Y4 represents the rotating speeds of the third rotary element RE3 and the sixth rotary element RE6 which are connected to each other. The first and second differential mechanisms 38 and 40 may be constructed as in a vehicle 200 of FIG. 24 and as indicated in the collinear charts of FIGS. 25-27, such that the vertical line Y1 represents the rotating speed of the second rotary element RE2 selectively connected to the casing 18 through the brake BR1, and the rotating speed of the fourth rotary element RE4 connected to the first motor/generator MG1, the vertical line Y2 represents the rotating speed of the first rotary element RE1 connected to the engine 12, the vertical line Y3 represents the rotating speed of the fifth rotary element RE5 connected to the output shaft 24, and the vertical line Y4 represents the rotating speeds of the third and sixth rotary elements RE3 and RE6 connected to each other. In the vehicle 200, the clutch CLc is the second coupling device for selectively connecting the second and fourth rotary elements RE2 and RE4 to each other. However, the U/D input split HV reverse drive sub-mode cannot be established in the engaged state of the brake BR1. On the other hand, there are available two U/D input split HV forward drive sub-modes, which are a low-engine-speed sub-mode established in the engaged state of the clutch CL1 and a high-engine-speed sub-mode established in the engaged state of the brake BR1, as indicated in the collinear charts of FIGS. 25 and 26 and as indicated in the table of FIG. 28. In the low-engine-speed sub-mode, the rotary motion of the engine 12 is input to the first power transmitting portion 20 such that the speed Ne of the input rotary motion is not changed. In the high-engine-speed sub-mode, the rotary motion of the engine 12 is input to the first power transmitting portion 20 such that the speed Ne of the input rotary motion is raised. FIG. 25 is the collinear chart indicating the relative rotating speeds of the rotary elements when the vehicular power transmitting system 14 of the vehicle 200 of FIG. 24 is placed in its U/D input split HV forward low-speed drive sub-mode, while FIG. 26 is the collinear chart indicating the relative rotating speeds of the rotary elements when the vehicular power transmitting system 14 of the vehicle 200 of FIG. 25 is placed in its U/D input split HV forward high-speed drive sub-mode. FIG. 27 is the collinear chart indicating the relative rotating speeds of the rotary elements when the power transmitting system 14 of the vehicle 200 of FIG. 24 is placed in the OLD input split HV forward drive sub-mode, while FIG. 28 is the table indicating the operating states of the clutches CL1 and CLc and the brake BR1 in the different drive sub-modes of the vehicle 200 of FIG. 24.

In the illustrated embodiment, the HV drive mode includes the U/D input split HV drive sub-modes to be established in the engaged state of the clutch CL1, and the O/D input split HV drive sub-modes to be established in the engaged state of the clutch CLc. However, the first and second differential mechanisms 38 and 40 may be constructed such that the HV drive mode includes U/D input split HV drive sub-modes to be established in the engaged state of the clutch CLc, and the O/D input split HV drive sub-modes to be established in the engaged state of the clutch CL1, as in a vehicle 300 of FIG. 29 and a vehicle 400 of FIG. 33, as indicated in the collinear charts of FIGS. 30, 31 and 34-36, and as indicated in the tables of FIGS. 32 and 37. In this case, the O/D input split engine-braking EV drive sub-mode is the first engine-braking drive mode to be established in the engaged state of the clutch CL1, while the UD input split engine-braking EV drive sub-mode is the second engine-braking drive mode to be established in the engaged state of the clutch CLc.

Figure 29:
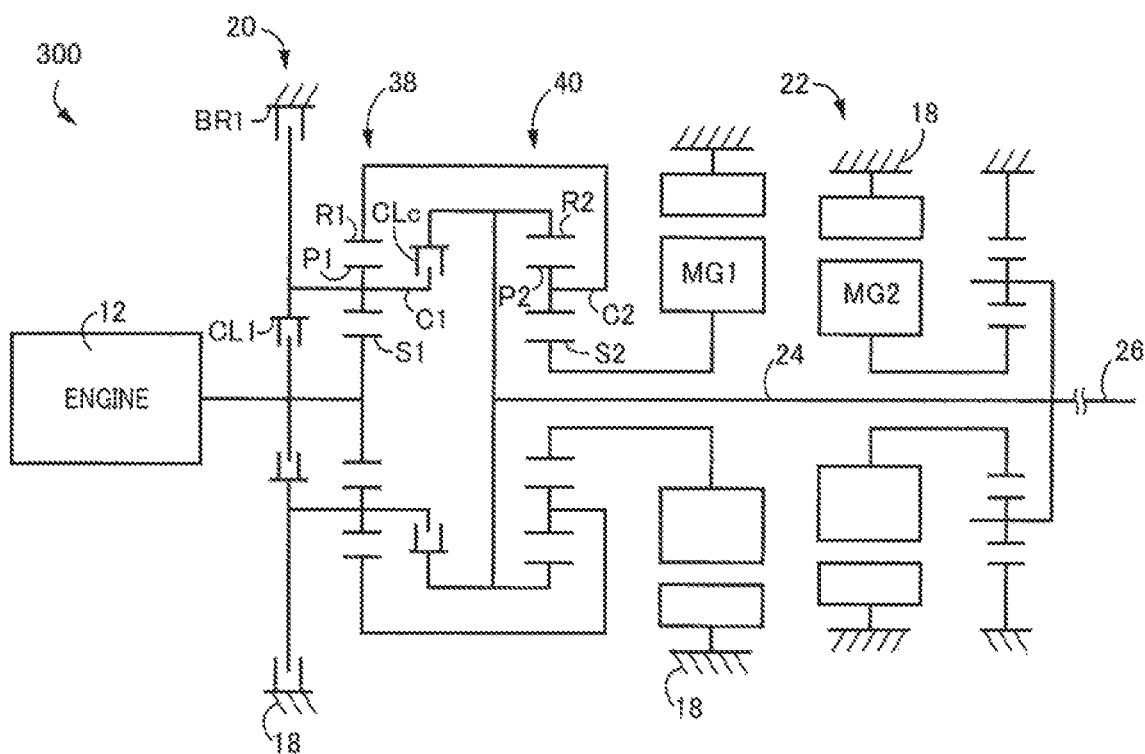
FIG. 29 is a schematic view showing an arrangement of a vehicular power transmitting system according to a still further embodiment of the invention, which is different from that of FIG. 1.
Figure 30:
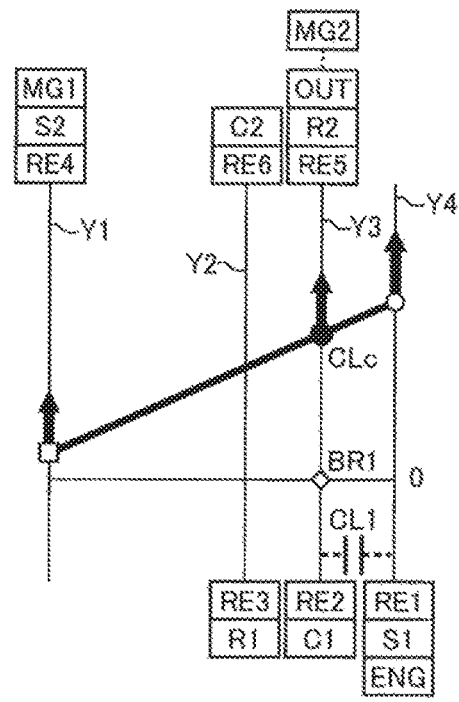
FIG. 30 is a collinear chart indicating the relative rotating speeds of the rotary elements when the vehicular power transmitting system of FIG. 29 is placed in its U/D input split HV forward drive sub-mode.
Figure 31:
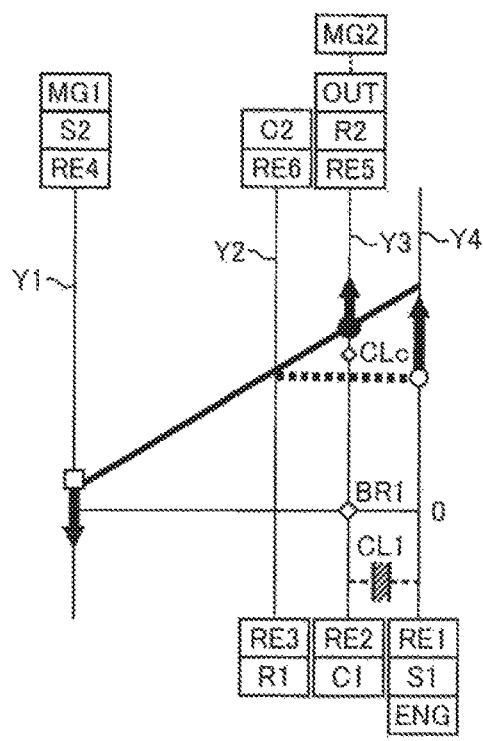
FIG. 31 is a collinear chart indicating the relative rotating speeds of the rotary elements when the vehicular power transmitting system of FIG. 29 is placed in its O/D input split HV forward drive sub-mode.

In the vehicle 300 of FIG. 29, the first and second differential mechanisms 38 and 40 are constructed such that the relative rotating speeds of the first through sixth rotary elements RE1-RE6 are indicated in the collinear charts of FIGS. 30 and 31 wherein the vertical line Y1 represents the rotating speed of the fourth rotary element RE4 connected to the first motor/generator MG1, the vertical line Y2 represents the rotating speeds of the third and sixth rotary elements RE3 and RE6 connected to each other, the vertical line Y3 represents the rotating speed of the second rotary element RE2 selectively connected to the casing 18 through the brake BR1, and the rotating speed of the fifth rotary element RE5 connected to the output shaft 24, and the vertical line Y4 represents the rotating speed of the first rotary element RE1 connected to the engine 12. In the vehicle 300, the clutch CLc is the second coupling device for selectively connecting the second and fifth rotary elements RE2 and RE5 to each other. FIG. 30 is the collinear chart indicating the relative rotating speeds of the rotary elements when the power transmitting system 14 of the vehicle 300 of FIG. 29 is placed in the U/D input split HV forward drive sub-mode, while FIG. 31 is the collinear chart indicating the relative rotating speeds of the rotary elements when the power transmitting system 14 of the vehicle 300 is placed in the O/D input split HV forward drive sub-mode. FIG. 32 is the table indicating the operating states of the clutches CL1, brake BR1 and clutch CLc in the different drive sub-modes in the vehicle 300 of FIG. 29.

Figure 33:
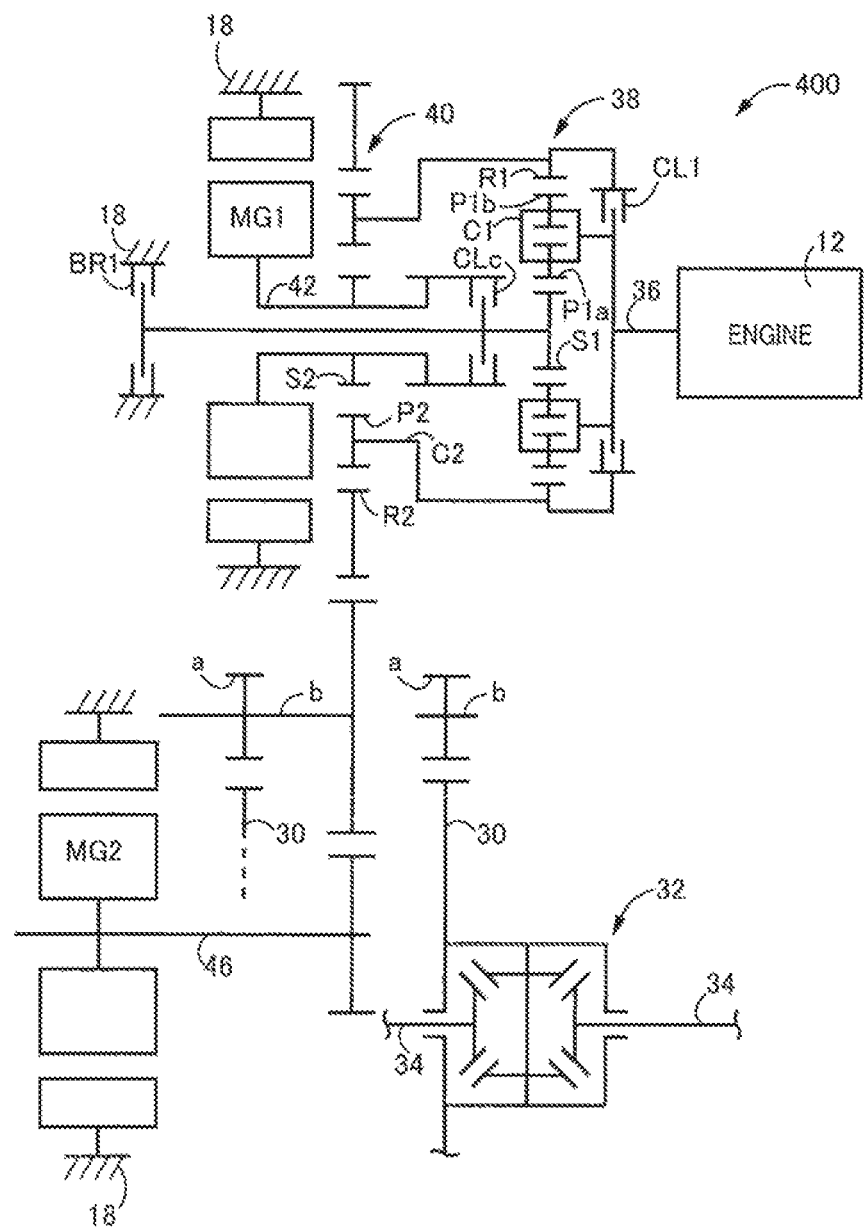
FIG. 33 is a schematic view showing an arrangement of a vehicular power transmitting system according to still another embodiment of the invention, which is different from that of FIG. 1.
Figure 34:
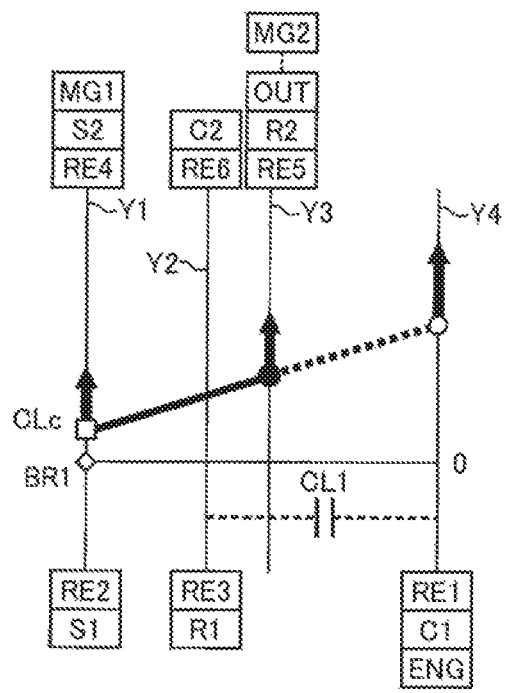
FIG. 34 is a collinear chart indicating the relative rotating speeds of the rotary elements when the vehicular power transmitting system of FIG. 33 is placed in its U/D input split HV forward drive sub-mode.
Figure 35:
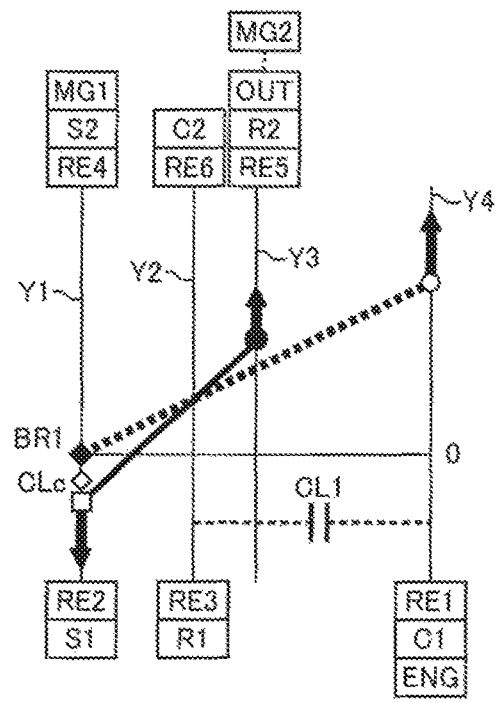
FIG. 35 is a collinear chart indicating the relative rotating speeds of the rotary elements when the vehicular power transmitting system of FIG. 33 is placed in its O/D input split HV forward low-speed drive sub-mode.
Figure 36:
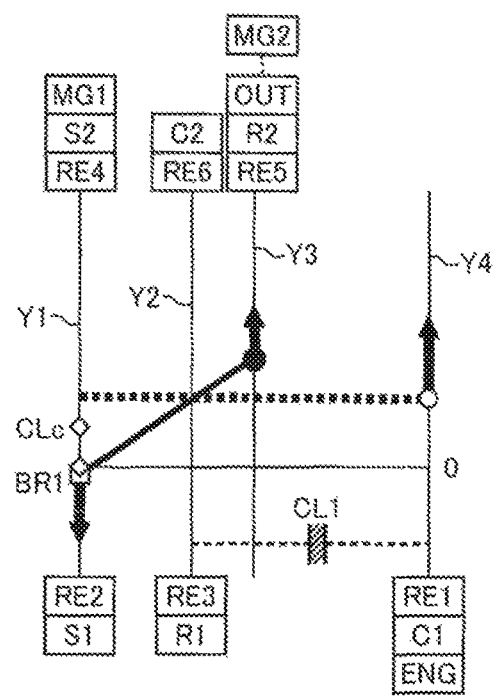
FIG. 36 is a collinear chart indicating the relative rotating speeds of the rotary elements when the vehicular power transmitting system of FIG. 33 is placed in its O/D input split HV forward high-speed drive sub-mode.

In the vehicle 400 of FIG. 33, on the other hand, the first and second differential mechanisms 38 and 40 are constructed such that the relative rotating speeds of the first through sixth rotary elements RE1-RE6 are indicated in the collinear charts of FIGS. 34-36 wherein the vertical line Y1 represents the rotating speed of the second rotary element RE2 selectively connected to the casing 18 through the brake BR1, and the rotating speed of the fourth rotary element RE4 connected to the first motor/generator MG1, the vertical line Y2 represents the rotating speeds of the third and sixth rotary elements RE3 and RE6 connected to each other, the vertical line Y3 represents the rotating speed of the fifth rotary element RE5 connected to the output shaft 24, and the vertical line Y4 represents the rotating speed of the first rotary element RE1 connected to the engine 12. In the vehicle 400, the clutch CLc is the second coupling device for selectively connecting the second and fourth rotary elements RE2 and RE4 to each other, and there are available two O/D input split HV forward drive sub-modes, which are a low-engine-speed sub-mode established in the engaged state of the brake BR1 and a high-engine-speed sub-mode established in the engaged state of the clutch CL1, as indicated in the collinear charts of FIGS. 35 and 36 and as indicated in the table of FIG. 37. In the low-engine-speed sub-mode, the rotary motion of the engine 12 is input to the first power transmitting portion 20 such that the speed Ne of the input rotary motion is lowered. In the high-engine-speed sub-mode, the rotary motion of the engine 12 is input to the first power transmitting portion 20 such that the speed Ne of the input rotary motion is not changed. FIG. 34 is the collinear chart indicating the relative rotating speeds of the rotary elements when the power transmitting system 14 of the vehicle 400 of FIG. 33 is placed in its U/D input split HV forward drive sub-mode, FIG. 35 is the collinear chart indicating the relative rotating speeds of the rotary elements when the power transmitting system 14 of the vehicle 400 of FIG. 33 is placed in its O/D input split HV forward low-speed drive sub-mode while FIG. 36 is the collinear chart indicating the relative rotating speeds of the rotary elements when the power transmitting system 14 of the vehicle 400 is placed in its O/D input split HV forward high-speed drive sub-mode. FIG. 37 is the table indicating the operating states of the clutches CL1 and CLc and the brake BR1 in the different drive sub-modes of the vehicle 400 of FIG. 33.

In the illustrated embodiment, the first differential mechanism 38 is a planetary gear mechanism of a double-pinion type, while the second differential mechanism 40 is a planetary gear mechanism of a single-pinion type. However, the first differential mechanism may be planetary gear mechanism of a single-pinion type, and the second differential mechanism may be a planetary gear mechanism of a double-pinion type. Therefore, it will be obvious that the relationship between the first sun gear S1, first carrier C1 and first ring gear R1 and the first through third rotary elements RE1-RE3 in the first differential mechanism, and the relationship between the second sun gear S2, second carrier C2 and second ring gear R2 and the fourth through sixth rotary elements RE4-RE6 in the second differential mechanism, are not limited to those in the first and second differential mechanisms 38 and 40 in the illustrated embodiment.

In the illustrated embodiment, the clutches CL1 and CLc and the brake BR1 are hydraulically operated wet-type frictional coupling devices. These hydraulically operated coupling devices may be replaced by coupling devices the operating states of which are electrically controllable.

In the illustrated embodiment, the vehicle 10, 100, 200, 300, 400 is provided with the brake BR1 for selectively connecting the second rotary element RE2 to the casing 18. However, the brake BR1 for selectively connecting the second rotary element RE2 to the casing 18 may be replaced by a brake for selectively connecting the first rotary element RE1 operatively connected to the engine 12 in a power transmittable manner, to the casing 18. Further, the power transmitting system of the vehicle to be controlled by the control apparatus according to the present invention need not be provided with the brake BR1. In the absence of the brake BR1, the HV drive mode can be switched between the U/D and O/D input split sub-modes. Further, the engine-braking drive mode of the vehicle can be switched between the first engine-braking drive mode to be established in the engaged state of the clutch CL1, and the second engine-braking drive mode to be established in the engaged stat of the clutch CLc. In the gear train of the vehicle 10, 100, 200, 300 and 400 described above, the second power transmitting portion 22 is coaxial with the input shaft 36. However, the second power transmitting portion 22 may be disposed on an axis which is radially spaced from the axis of the input shaft 36. While the power transmitting system 14 to be controlled by the control apparatus in the illustrated embodiment is provided on the vehicle 10 of the FR type (front-engine rear-drive type), the control apparatus according to the invention is equally applicable to a power transmitting system of a vehicle of any other type, such as the vehicle 100, 400 of the FF type (front-engine front-drive type) and a vehicle of an RR type (rear-engine rear-drive type).

While the preferred embodiment and its modifications have been described for illustrative purpose only, it is to be understood that the present invention may be embodied with various changes and improvements, which may occur to those skilled in the art.

NOMENCLATURE OF ELEMENTS

10: Vehicle
12: Engine
16: Drive wheels
24: Output shaft (Output rotary member)
38: First differential mechanism
C1: First carrier (First rotary element)
R1: First ring gear (Second rotary element)

S1: First sun gear (Third rotary element)
40: Second differential mechanism
S2: Second sun gear (Fourth rotary element)
C2: Second carrier (Fifth rotary element)
R2: Second ring gear (Sixth rotary element)
90: Electronic control device (Control apparatus)
94: Drive mode control portion
96: Running state determining portion
CL1: Clutch (First coupling device)
CLc: Clutch (Second coupling device)
MG1: First motor/generator
MG2: Second motor/generator
100, 200, 300, 400: Vehicle

What is claimed is:

1. A control apparatus for a power transmitting system of a vehicle including: an engine; an output rotary member; drive wheels connected to the output rotary member; a first differential mechanism having a first rotary element operatively connected to the engine in a power transmittable manner, a second rotary element, and a third rotary element; a second differential mechanism having a fourth rotary element, a fifth rotary element connected to the output rotary member, and a sixth rotary element connected to the third rotary element; a first motor/generator which is operatively connected to the fourth rotary element in a power transmittable manner, and an operating state of which is controlled to control a differential state of the second differential mechanism; a second motor/generator operatively connected to the output rotary member in a power transmittable manner; a first coupling device for connecting two elements of the first, second and third rotary elements to each other; and a second coupling device for connecting the second rotary element to one of the fourth and fifth rotary elements, the control apparatus comprising:

a drive mode control portion configured to selectively establish one of a first engine-braking drive mode and a second engine-braking drive mode of the power transmitting system in which a braking torque of the engine is applied to the vehicle, the first engine-braking drive mode being established in an engaged state of the first coupling device, while the second engine-braking drive mode being established in an engaged state of the second coupling device, and wherein the drive mode control portion switches the power transmitting system between the first and second engine-braking drive modes, such that an operating speed of the engine is held constant in the process of switching between the first and second engine-braking drive modes.

2. The control apparatus according to claim 1, wherein all of the rotary elements of the first and second differential mechanisms are rotated as a unit when the first and second coupling devices are placed in the engaged states, and the drive mode control portion switches the power transmitting system between the first and second engine-braking drive modes, by switching operating states of the first and second coupling devices in a state of the first and second differential mechanisms in which all of their rotary elements are rotated as a unit.

3. The control apparatus according to claim 1, wherein the drive mode control portion switches the power transmitting system between the first and second engine-braking drive modes, by controlling the first and second coupling devices such that one of the first and second coupling devices which has been placed in a released state prior to a switching operation of the power transmitting system between the first and second engine-braking drive modes is brought into the engaged state while the other of the first and second coupling devices which has been placed in the engaged state prior to the switching operation is brought into a released state, the drive mode control portion controlling the first motor/generator such that the operating speed of the engine is held constant in the process of the switching operation.

4. The control apparatus according to claim 3, wherein the drive mode control portion controls the first motor/generator in the process of a change of a rotating speed of the third rotary element, such that the operating speed of the engine is held constant.

5. The control apparatus according to claim 1, wherein all of the rotary elements of the first and second differential mechanisms are rotated as a unit when the first and second coupling devices are placed in the engaged states, and the drive mode control portion is configured to selectively implement: a synchronous switching control for switching the power transmitting system between the first and second engine-braking drive modes, by switching operating states of the first and second coupling devices in a state of the first and second differential mechanisms in which all of their rotary elements are rotated as a unit; and a non-synchronous switching control for switching the power transmitting system between the first and second engine-braking drive modes, by controlling the first and second coupling devices such that one of the first and second coupling devices which has been placed in a released state prior to the switching of the power transmitting system between the first and second engine-braking drive modes is brought into the engaged state while the other of the first and second coupling devices which has been placed in the engaged state prior to the switching of the power transmitting system between the first and second engine-braking drive modes is brought into a released state, and by controlling the first motor/generator such that the operating speed of the engine is held constant in the process of switching of the power transmitting system between the first and second engine-braking drive modes, and the drive mode control portion is configured to implement the synchronous switching control with higher priority than the non-synchronous switching control.

6. The control apparatus according to claim 5, further comprising a running state determining portion configured to determine whether the vehicle is placed in a running state in which the drive mode control portion can implement the synchronous switching control, by determining whether operating states of the first and second differential mechanisms are changing, with a change of a running speed of the vehicle, toward a state in which all of their rotary elements are rotated as a unit.

7. The control apparatus according to claim 6, wherein where the running state determining portion has determined that the vehicle is in the running state in which the drive mode control portion can implement the synchronous switching control, the drive mode control portion does not implement the synchronous switching control until the first and second differential mechanisms have been brought into the state in which all of their rotary elements are rotated as a unit.

8. The control apparatus according to claim 1, wherein the drive mode control portion determines whether the power transmitting system should be switched from one of the first and second engine-braking drive modes to the other, according to a predetermined drive mode switching relationship, and switches the power transmitting system from said one engine-braking drive mode to said other engine-braking drive mode when the drive mode control portion has determined that the power transmitting system should be switched from said one engine-braking drive mode to said other engine-braking drive mode.

9. The control apparatus according to claim 2, wherein the drive mode control portion determines whether the power transmitting system should be switched from one of the first and second engine-braking drive modes to the other, according to a predetermined drive mode switching relationship, and switches the power transmitting system from said one engine-braking drive mode to said other engine-braking drive mode when the drive mode control portion has determined that the power transmitting system should be switched from said one engine-braking drive mode to said other engine-braking drive mode.

10. The control apparatus according to claim 3, wherein the drive mode control portion determines whether the power transmitting system should be switched from one of the first and second engine-braking drive modes to the other, according to a predetermined drive mode switching relationship, and switches the power transmitting system from said one engine-braking drive mode to said other engine-braking drive mode when the drive mode control portion has determined that the power transmitting system should be switched from said one engine-braking drive mode to said other engine-braking drive mode.

11. The control apparatus according to claim 4, wherein the drive mode control portion determines whether the power transmitting system should be switched from one of the first and second engine-braking drive modes to the other, according to a predetermined drive mode switching relationship, and switches the power transmitting system from said one engine-braking drive mode to said other engine-braking drive mode when the drive mode control portion has determined that the power transmitting system should be switched from said one engine-braking drive mode to said other engine-braking drive mode.

12. The control apparatus according to claim 5, wherein the drive mode control portion determines whether the power transmitting system should be switched from one of the first and second engine-braking drive modes to the other, according to a predetermined drive mode switching relationship, and switches the power transmitting system from said one engine-braking drive mode to said other engine-braking drive mode when the drive mode control portion has determined that the power transmitting system should be switched from said one engine-braking drive mode to said other engine-braking drive mode.

13. The control apparatus according to claim 6, wherein the drive mode control portion determines whether the power transmitting system should be switched from one of the first and second engine-braking drive modes to the other, according to a predetermined drive mode switching relationship, and switches the power transmitting system from said one engine-braking drive mode to said other engine-braking drive mode when the drive mode control portion has determined that the power transmitting system should be switched from said one engine-braking drive mode to said other engine-braking drive mode.

14. The control apparatus according to claim 7, wherein the drive mode control portion determines whether the power transmitting system should be switched from one of the first and second engine-braking drive modes to the other, according to a predetermined drive mode switching relationship, and switches the power transmitting system from said one engine-braking drive mode to said other engine-braking drive mode when the drive mode control portion has determined that the power transmitting system should be switched from said one engine-braking drive mode to said other engine-braking drive mode.

* * * * *